(12) United States Patent
Hayes, Jr. et al.

(10) Patent No.: US 8,374,915 B2
(45) Date of Patent: *Feb. 12, 2013

(54) PRESENCE OPTIMIZED ADVERTISEMENT PUBLISHING SYSTEM AND METHODOLOGY

(75) Inventors: Marc Francis Hayes, Jr., Roswell, GA (US); Ahmad John Aslami, Alpharetta, GA (US); Scott David Bogartz, Norcross, GA (US); John Charles Hanger, Alpharetta, GA (US)

(73) Assignee: Contact at Once!, Alpharetta, GA (US)

( * ) Notice: Subject to any disclaimer, the term of this patent is extended or adjusted under 35 U.S.C. 154(b) by 740 days.

This patent is subject to a terminal disclaimer.

(21) Appl. No.: 11/408,864

(22) Filed: Apr. 20, 2006

(65) Prior Publication Data

US 2010/0076837 A1    Mar. 25, 2010

Related U.S. Application Data

(60) Provisional application No. 60/673,143, filed on Apr. 20, 2005, provisional application No. 60/713,394, filed on Sep. 1, 2005.

(51) Int. Cl.
*G07G 1/00* (2006.01)

(52) U.S. Cl. ............... 705/14.73; 705/14.4; 705/14.49; 705/14.61

(58) Field of Classification Search ............... 705/8, 10, 705/14, 14.4, 14.49, 14.61, 14.73
See application file for complete search history.

(56) References Cited

U.S. PATENT DOCUMENTS

| | | | |
|---|---|---|---|
| 6,223,165 B1 | 4/2001 | Lauffer | |
| 6,909,708 B1 | 6/2005 | Krishnaswamy et al. | |
| 7,263,526 B1* | 8/2007 | Busey et al. ................... | 1/1 |
| 7,580,850 B2 | 8/2009 | Lurie | |
| 2001/0040942 A1 | 11/2001 | Glowny et al. | |
| 2002/0010757 A1 | 1/2002 | Granik et al. | |
| 2003/0126205 A1* | 7/2003 | Lurie ......................... | 709/204 |
| 2004/0162882 A1* | 8/2004 | Mora .......................... | 709/207 |
| 2005/0065837 A1* | 3/2005 | Kosiba et al. ................ | 705/9 |
| 2005/0091111 A1* | 4/2005 | Green et al. ................ | 705/14 |
| 2006/0106711 A1* | 5/2006 | Melideo ..................... | 705/37 |
| 2009/0187459 A1 | 7/2009 | Hayes, Jr. et al. | |

FOREIGN PATENT DOCUMENTS

WO    WO 99/14920    *    3/1999
WO    WO 02/09399    *    1/2002

OTHER PUBLICATIONS

Non-Final Office Action issued on Mar. 30, 2011 for U.S. Appl. No. 11/409,279 (Inventor—Hayes, Jr.).
Amendment Submitted/Entered with CPA/RCE filed on Jan. 21, 2011 for U.S. Appl. No. 11/409,279 (Inventor—Hayes, Jr.).
Final Rejection issued on Oct. 13, 2010 for U.S. Appl. No. 11/409,279 (Inventor—Hayes, Jr.).
Response after Non-Final Rejection filed on Jul. 30, 2010 for U.S. Appl. No. 11/409,279 (Inventor—Hayes, Jr.).
Non-Final Office Action issued on Mar. 30, 2010 for U.S. Appl. No. 11/409,279 (Inventor—Hayes, Jr.).
Final Office Action issued Oct. 7, 2011 in U.S. Appl. No. 11/409,279, filed Apr. 20, 2006 (First Inventor—Hayes Jr.; pp. 1-60).

* cited by examiner

*Primary Examiner* — Sarah Monfeldt
(74) *Attorney, Agent, or Firm* — Smith, Gambrell & Russell

(57) ABSTRACT

A system and method are provided for publishing certain advertising information on-line. Presence indicators are incorporated into merchant advertisements published online. The presence indicators are preferably active hyper-links that are configured to allow a consumer to send a request to a merchant for initiation of a 2-way real time communications session. The system provides for adding one of a pool of merchant representatives to an opened communications session with the consumer. Advertisements may be selectively published or withheld from publication based upon the availability status of an associated merchant.

36 Claims, 30 Drawing Sheets

```
<a
onclick="javascript:window.open('http://applications.contac
tatonce.com/caoclientcontainer.aspx?ProviderId=261&Merchant
Id=219&PlacementId=1&Location=Tallahassee&PriceRangeLow=$75
0&PriceRangeHigh=$1000&
OriginationUrl='+encodeURIComponent(location.href),'','resi
zable=yes,toolbar=no,menubar=no,location=no,scrollbars=no,s
tatus=no,height=400,width=600');return false;"
 href="#"><img
src="http://applications.contactatonce.com/getagentstatusim
age.aspx?ProviderId=261&MerchantId=219&PlacementId=1"
border="0" onerror="this.height=0;this.width=0;"/></a>
```

*Sample Integration Markup for Instant Messaging*

FIG. 3D

```
<a href="#"
onclick="javascript:window.open('http://applications.contac
tatonce.com/emailclientcontainer.aspx?ProviderId=261&Mercha
ntId=219&PlacementId=1&Location=Tallahasee&OriginationUrl='
+encodeURIComponent(location.href),'','resizable=yes,toolba
r=no,menubar=no,location=no,scrollbars=no,status=no,height=
750,width=775,top=100');return false;">
<img src="/images/email.gif" class="contact_button"
border="0"/></a>
```

*Sample Integration Markup for Instant Messaging*

FIG. 3E

```
<a href="#"
onclick="javascript:window.open('http://applications.contac
tatonce.com/calloutclientcontainer.aspx?ProviderID=261&Merc
hantID=219&PlacementId=1&Location=Tallahasse&OriginationUrl
='+encodeURIComponent(location.href),'','resizable=yes,tool
bar=no,menubar=no,location=no,scrollbars=no,status=no,heigh
t=325,width=525,top=100');return false;">
<img src="/images/click_to_call.gif" class="contact_button"
border="0"/></a>
```

*Sample Integration Markup for Instant Messaging*

FIG. 3F

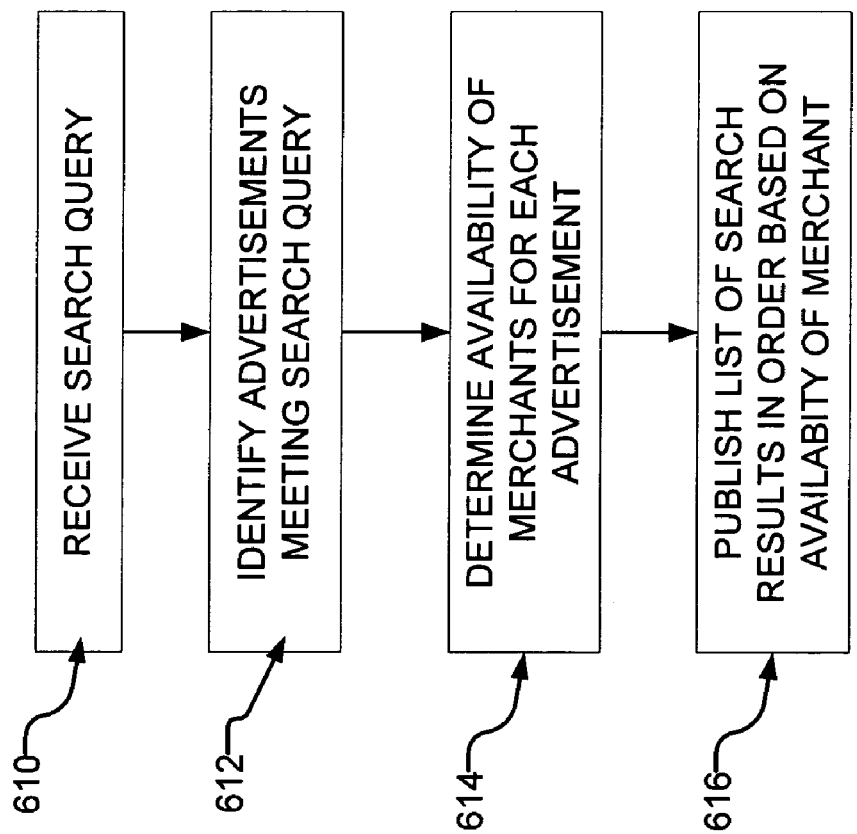

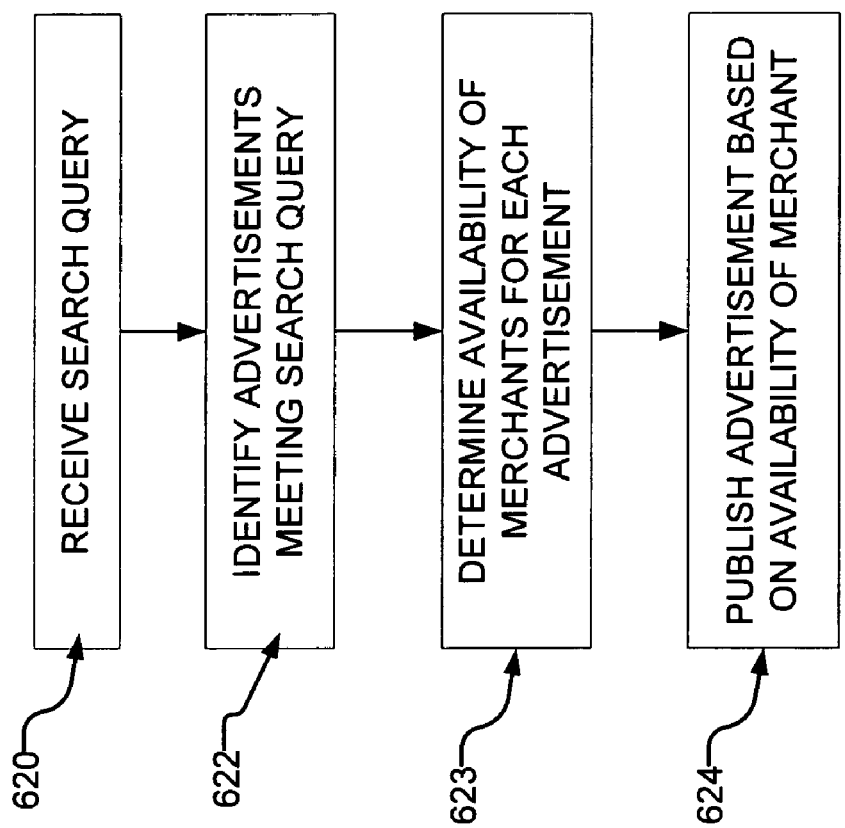

PRESENCE OPTIMIZED ADVERTISEMENT PUBLISHING SYSTEM AND METHODOLOGY

CROSS-REFERENCE TO RELATED APPLICATION(S)

This application claims priority with respect to U.S. Provisional Application having Ser. No. 60/673,143 filed on Apr. 20, 2005 and U.S. Provisional Application having Ser. No. 60/713,394 filed on Sep. 1, 2005, the disclosures of which are hereby incorporated herein by reference.

TECHNICAL FIELD OF THE INVENTION

The present invention is generally related to publication of online advertisements and search results. More particularly, the present invention is directed to a system and method of publishing advertisements and online search results based upon the availability of an advertiser.

BACKGROUND

The reach of the Internet is vast. People from one corner of the world are able to find and learn about ideas and information from sources in other far corners of the world. Consumers are able to easily research products and services using online resources prior to making purchases. Further, consumers are able to locate sources for goods/services of interest using online resources.

Online advertising has become a very popular way for merchants and service providers to advertise their goods and services. Aside from the wide reach of the Internet, this is due in large part to the ease of access to the Internet and the speed and relative efficiencies involved in actually preparing and publishing an advertisement online. Many online publishers will provide merchants and service providers with the publication of an advertisement accessible online (via the Internet, for example) for a fee. Many consumers begin their search for a given product or service via conducting an online search via, for example, a search engine an online search engine such as, or example, Yahoo!, Google, AltaVista or the like. These search engines are provided by a paid search provider, such as, for example, Google or Yahoo!. For a fee, paid search providers will place a merchants advertisement in a more advantageous location (such as, for example, the top of the list or on the first page of published search results) when presenting search results. In this way, a merchant may increase the chances that his advertisement will reach consumers. It should be noted that certain publishers will also provide the ability to conduct an online search, typically of other information published by the publisher. Using these systems, consumers are also able to obtain search results for a given search query.

Certain merchants sell products or services that are typically researched online but purchased offline. For example, merchants/sellers of automobiles, homes, apartments, legal services, professional services, and/or home services are more likely to have their products/services researched by consumers on-line but ultimately purchased offline. The key for these types of merchants/advertisers is to get the consumer to contact them. These types of merchants are typically looking for their advertisements to generate "leads" rather than a mere consumer viewing of the ad represented by the "clicks".

Current online advertising systems do not adequately fulfill the needs of these types of merchants. For example, a pay-per-call system has been proposed for use with advertisers. These proposed systems allow a consumer viewing a particular online published advertisement to initiate a telephone call to a representative of the advertiser by clicking on, for example, a phone icon presented/displayed in the particular advertisement.

The problem with these systems has been that they are awkward for all but the more technically savvy to make use of. Further, once a telephone call is initiated by a consumer, if a representative of the merchant does not answer the call, the consumer will more than likely not make the attempt again. Further, the merchant is charged for the click thru, however derives no benefit at all from it and will often dispute the publisher's or search providers' attempt to bill for the useless click thru. These two problems translate into lost revenue for paid search providers and/or publishers, as well as advertisers.

In recent years many enterprises have adopted internet and World Wide Web (WWW) technologies to enable consumers to research, shop, find merchants and purchase desired goods or services. These enterprises essentially act as "intermediaries" between consumers and merchants/service providers. These intermediaries include Directory Service Providers, Search Engines, Category Aggregators, Online Classified Providers, Online Auction Sites and others. These intermediaries typically provide information ranging from basic identification of information, location, telephone numbers, maps and other logistical information concerning people, products, goods, services, merchants, service providers and others, to more advanced services/abilities that may include online catalogs, online order entry and other transactional services. Intermediaries often act as paid search providers, who, for a fee, will make sure that advertisers' goods/services are published and available for consumers to see on-line.

It is common for paid search providers (publisher) to host a web site, often associated with a related printed publication, such as a newspaper, to publish (or serve) advertisements (paid search ads) for one or more merchants of, for example, automobiles. The merchants may be, for example, automobile dealerships and/or individuals having certain vehicles available for sale. The collective publication of related items that are available for sale makes it easy for consumers to search out and find items of interest and, hopefully, initiate and conclude negotiations for the sale of those items.

In return for a fee paid by a merchant, the publisher of the web site will provide space (advertising space) on the web site for describing the item/automobile available for sale. Further, the publisher may provide a specific listing order of the advertisement. For example, an advertisement that is located near the top of the page or list, may be preferred by certain advertisers since it is more likely to draw the consumers interest and be viewed before the consumer selects another advertiser's product or loses interest and moves onto other matters.

In general, a consumer who is viewing a publisher's web site will first be required to initiate a search (either general or specific) via either the publishers search engine or another available search engine such as, for example, Yahoo!® or Google® to identify advertised items that are relevant to the consumers interests. The results of the search will typically be presented as a display of a list of all advertised items that meet the search query initiated by the consumer.

The order of the search results listing of advertised items may be random, alphabetic, based on advertised price, date of publication or other information. However, it is more likely that the order of the listing is based upon preferences given to certain advertisers who have paid a fee for such preferential listing order. As an advertiser, having your advertisement appear at the top of the list (as opposed to the bottom of the list) makes it more likely that a consumer will maintain interest in reviewing the list long enough to identify/find your advertisement and take the next steps to make the purchase or otherwise contact you (the advertiser) about the advertised item.

A typical search results listing will, via display on an associated display device, present a consumer with a listing of all advertisements that meet the consumer's interests (as indicated by a search query entered by the consumer). This listing of advertisements will typically be in a summary type format in which only the main general information concerning the advertised item is displayed. In order to view additional details included in an advertisement, the consumer must "click" on the summary listing (or a designated portion thereof) to advance to the complete advertisement pertaining to the item.

Like the typical printed advertisement, the typical online advertisement allows an advertiser to have information concerning a particular item/automobile published in a given ad space which appears on a web page at a given Universal resource locator (URL). The typical advertisement is limited to descriptive text and/or photographs pertaining to an automobile that is being offered for sale by the advertised.

Rarely, if ever, are all details that may be of interest to consumers concerning the advertised item set out in the advertisement. Most serious consumers will have additional questions concerning the advertised item that they want answered before they are in a position to move forward. In order for the advertisement to more likely be effective for the advertiser, it is common for the advertiser to include certain contact information via which a consumer may obtain additional information about the automobile for sale.

In order for a consumer to obtain additional information about an advertised item, they must either travel to a location specified in the advertisement or, perhaps, make a telephone call to a published telephone number set out in the advertisement. More recently, e-mail address information for the merchant may be published in the advertisement and the consumer may choose to solicit additional information from the merchant via sending an e-mail message to the merchant (often by simply clicking on a related e-mail address). In each case, the ability of the consumer to obtain prompt and complete information concerning the advertised item is limited as one or more intervening steps are required on the part of the consumer (for example: travel; properly address e-mail message; make telephone call to published telephone number). Each of these steps is time consuming. Further, even after taking such steps, whether or not the consumer will be successful in getting the information they desire is often contingent upon such things as, for example, whether or not correct contact information has been published in the advertisement; whether or not the advertiser actually/promptly responds and/ or whether or not the advertiser answers the telephone and/or places the consumer on hold for a lengthy period of time. An advertiser who is unable to promptly and completely respond to a consumers inquiry runs the risk of not only losing potential selling opportunity with respect to any particular advertised item, but also of leaving the consumer with the impression that the particular advertiser is inept, disorganized, dishonest or otherwise not worthy of doing business with for any reason. The result is lost revenue for the advertiser and the publisher.

FIG. 1A is a diagram depicting the various systems involved in allowing a consumer 130 to search the Internet and identify advertisements for products that meet the consumers search criteria. Typically, the user 130 will use a computer configured to run, for example, a web browser for reading web pages published by various publishers 110 and distributed via an associated web server. Typically, an advertiser 140 will have access to certain publishing controls hosted by the publisher 110 to allow the advertiser to place content and other descriptive advertising information for publishing by the publisher 110. Some published advertising will incorporate, for example, an instant messaging hyper-link to allow a consumer to engage a representative of the advertiser in a one-on-one textual communication. If the advertiser representative is not logged onto the Internet and their Instant Messenger system, or otherwise able to accept a page from a consumer, the consumer will not be able to get the information they desire.

FIG. 1B is a diagram depicting a screen shot of search results 160 pertaining to a consumer search query as displayed on a display device 50. The search results 160 are a listing of advertised items meeting a particular consumer search query.

This listing is in summary format and contains few details pertaining to the advertised item. In order to view further details of an advertised item, it is necessary for the consumer to click on a hyper-link (link) published within the summary of each advertised item. In this example, the search results 160 include a listing of six items 161-166. Each of the listed items 161-166 include hyper-links (links) 161L-166L that can be activated (clicked) to cause a web page containing the detailed advertisement of the advertised item to be displayed.

FIG. 1C is a diagram depicting a screenshot of an advertisement 170. In this example, advertisement 170 is displayed when link 161L (see FIG. 1B) is activated/clicked on by a consumer. In this example, the published advertisement includes a photograph 172 of the item and text 174 describing the features of the item. This text includes telephone 176 and e-mail contact information to allow a consumer to contact the merchant/advertiser with any questions they may have. Neither of these means of communication allow for near immediate communication. In fact, the consumer is likely to spend substantial time either waiting on hold for someone to answer the telephone or waiting on someone to respond to an e-mail inquiry. Further, whether or not a consumer actually makes contact with a merchant may not be track-able, and may thus be difficult to qualify as, for example, a sales lead.

The smart advertiser/merchant wants to obtain maximum benefit from the advertisements that they have published online. It is the rare advertiser who does not groan when making payments to the publisher for advertising, particularly when there is no clear connection that the published advertisements have generated any certified leads for the advertiser/merchant.

In order for an advertisement to more likely be successful for an advertiser/merchant, it is important that consumers actually make contact with the advertiser/merchant. Each step required of the consumer to make contact with the advertiser/merchant is a potential roadblock that could keep the consumer from ever making the desired contact with the advertiser/merchant. In the case of an online advertisement, a consumer may send an e-mail message to the advertiser asking about the advertised item. However, the chances that the advertiser will be able to respond to the consumer's inquiry within a few minutes (i.e. "while the iron is still hot") is generally very low. As a result, the chances that the interested consumer will lose interest and not follow up are quite high.

In short, the easier it is for a consumer to contact an advertiser/merchant and promptly obtain desired information concerning an advertised item, the higher the chances that the consumer will turn into a customer/buyer.

On-line advertisers have begun to incorporate the ability for consumers to initiate 2-way communications with the advertiser. This has been done by making use of known instant messaging (IM) technologies. Instant Messaging allows near instant internet-based communication between two parties using the same network and or service provider. Communication methods typically include text-based chat, voice over Internet protocol (VoIP) as well as other methods, such as, for example, file transfer, streaming video/audio, application sharing and other methods. Use of IM in the on-line advertising realm has been limited to publication of a "contact icon" in relation to a particular advertisement, that if clicked/activated, will allow a consumer to initiate, for example, a 2-way textual communication. Unfortunately, if the advertiser (advertiser representative) is not available to receive and engage in the 2-way communication, the consumers' time is wasted and the advertiser has lost a potential sales/lead opportunity. Further, as typical instant messaging systems require a user to select a specific named person in order to initiate a 2-way "chat" session, it is difficult to use instant messaging in advertising since a consumer often does not want to communicate with a specific named person but, rather, anyone associated with the merchant who will actually be able to assist them by answering their questions.

Numerous commercial applications of wireless messaging exist today including, for example, interactive pagers using various communication methods and protocols, mobile phone based text communication including those using the Short Message Service (SMS) protocol and Multi-media Message Service (MMS) protocol.

With respect to online advertising, advertisers are often charged based upon the size of the advertisement and/or the nature of the content of the advertisement. For example, text only advertisements may be charged at one rate, while an advertisement that contains text as well as, for example, photographs of an advertised item may be charged at a different rate. Further, the advertiser may be charged a fee based upon the number of times a consumer "clicks through" from, for example, the advertisement summary listing to the actual full-blown advertisement for a particular item.

The ease which current web browser/technology allows anyone viewing a web page to click through to an advertisement creates an issue for advertisers. Namely, increased fees for "false" or otherwise inadvertent/non-serious/fraudulent/malicious click through. Advertisers are not interested in paying for "false" click thru and are quick to have publishers justify or otherwise substantiate the number of click thrus that they are billed for.

SUMMARY OF THE INVENTION

The present invention provides a system and method of publishing online advertisements and search results. More particularly, the present invention is related to a system and method of publishing online advertisements and search results, wherein publication and placement of an advertisement at a given time is based, in part, upon the availability of a merchant.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A-FIG. 2I are diagrams depicting a system for publication of online advertisements and search results according to the present invention.

FIG. 3A-FIG. 3F are diagrams depicting an embodiment of the invention wherein a consumer can request a real time 2-way communication with a merchant via active links published in conjunction with an advertisement.

FIG. 6A-FIG. 6C are diagrams depicting a process for publishing an advertisement or presence indicator based upon the availability of a merchant.

DESCRIPTION OF THE INVENTION

The present invention is directed to a system and method for publishing advertisements in an online/electronic forum. The present invention is directed to providing a system for publishing online advertisements so as to optimize the value of a consumer click thru stemming from a merchant advertisement.

Figure 1A:
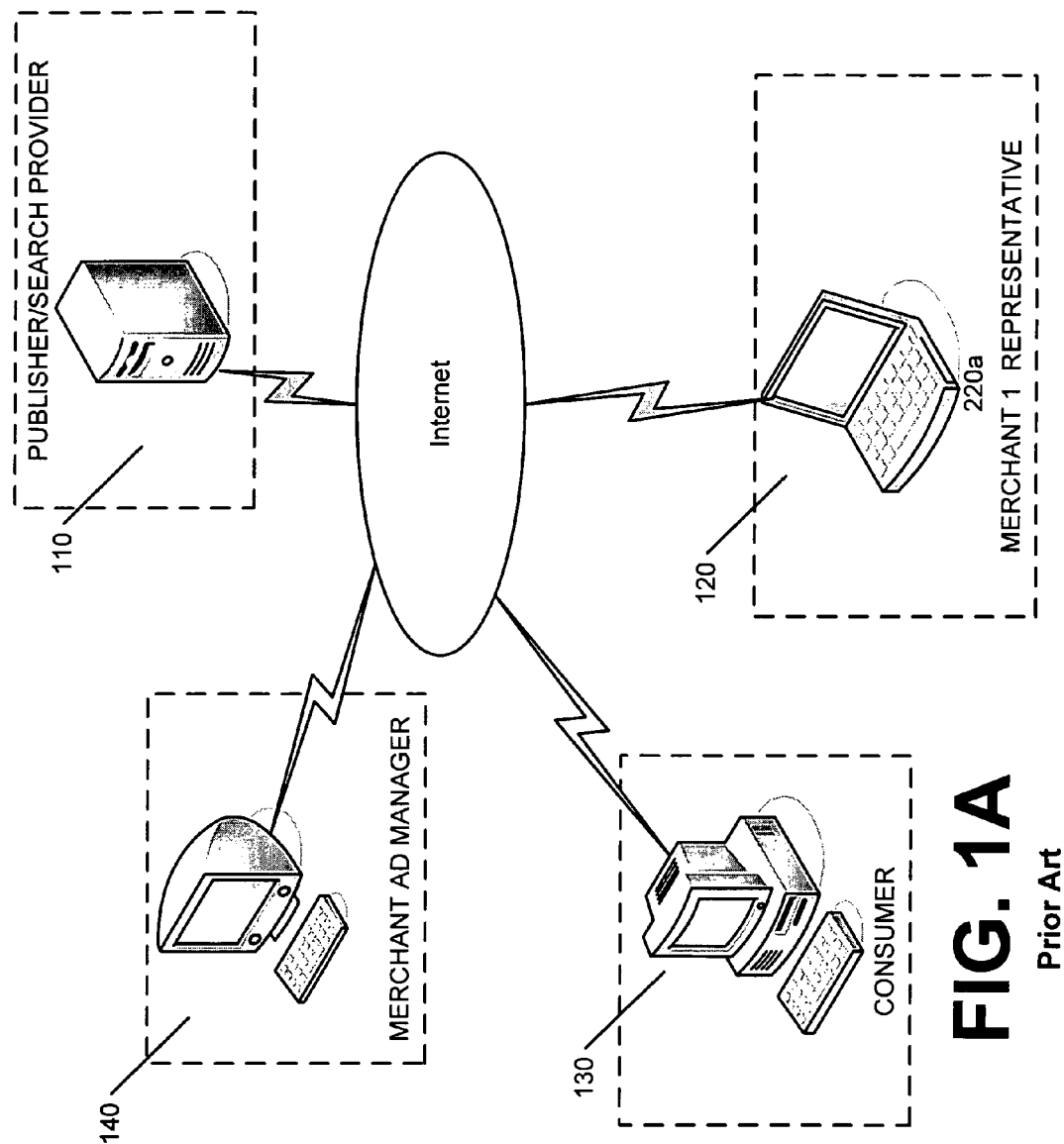
FIG. 1A-FIG. 1C are diagrams depicting a prior art system and method for publication of online advertisements.
Figure 1B:
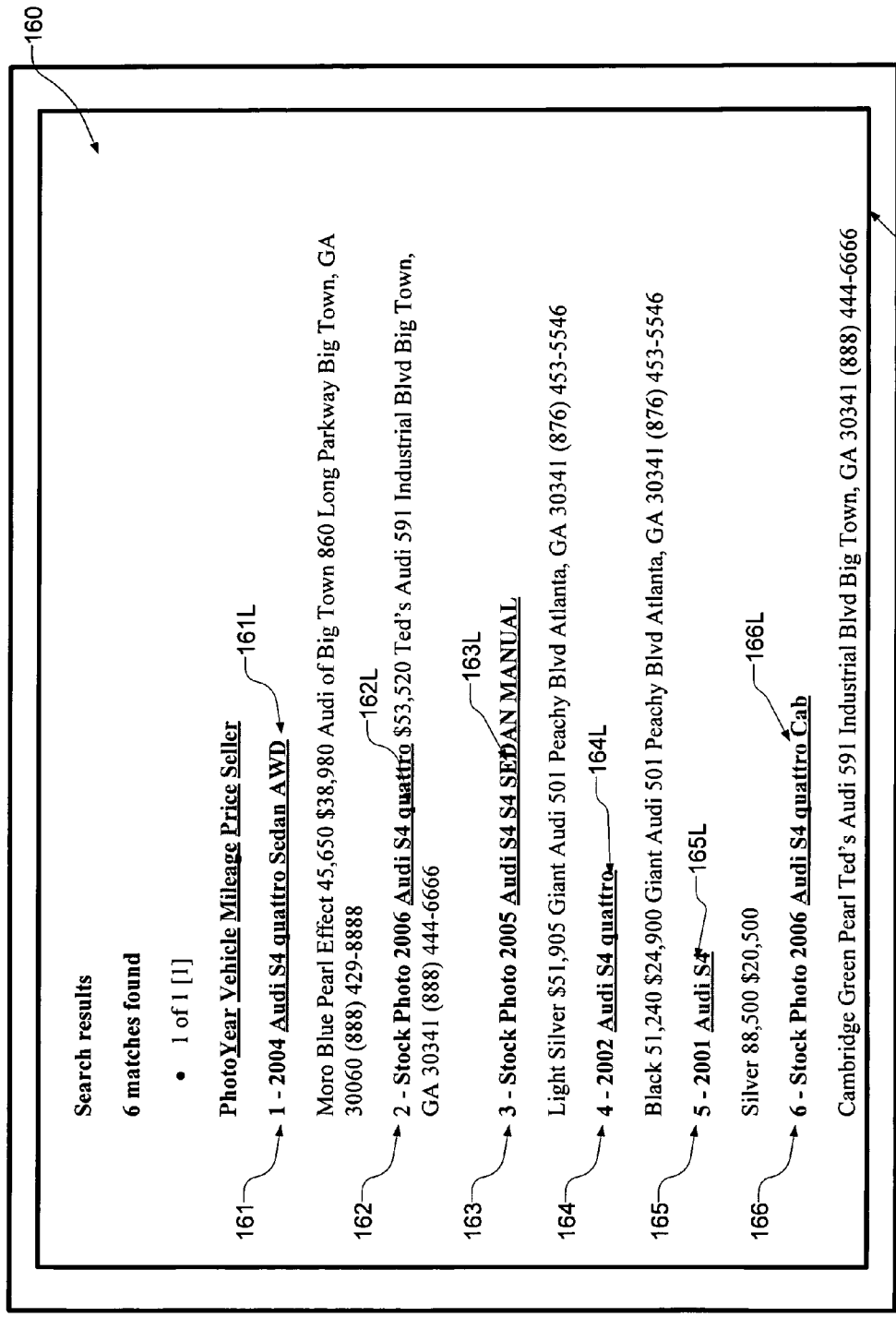
Figure 1C:
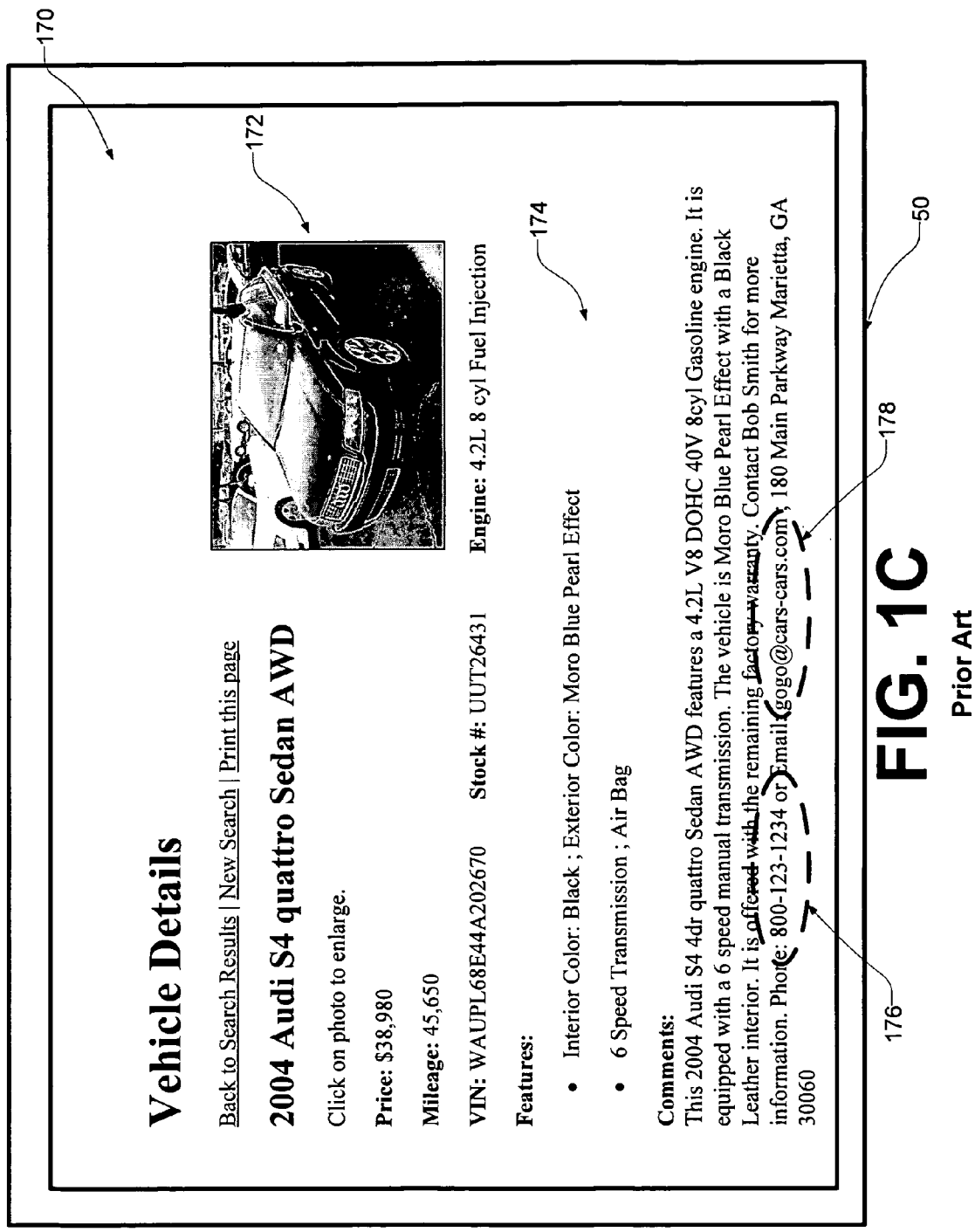
Figure 2A:
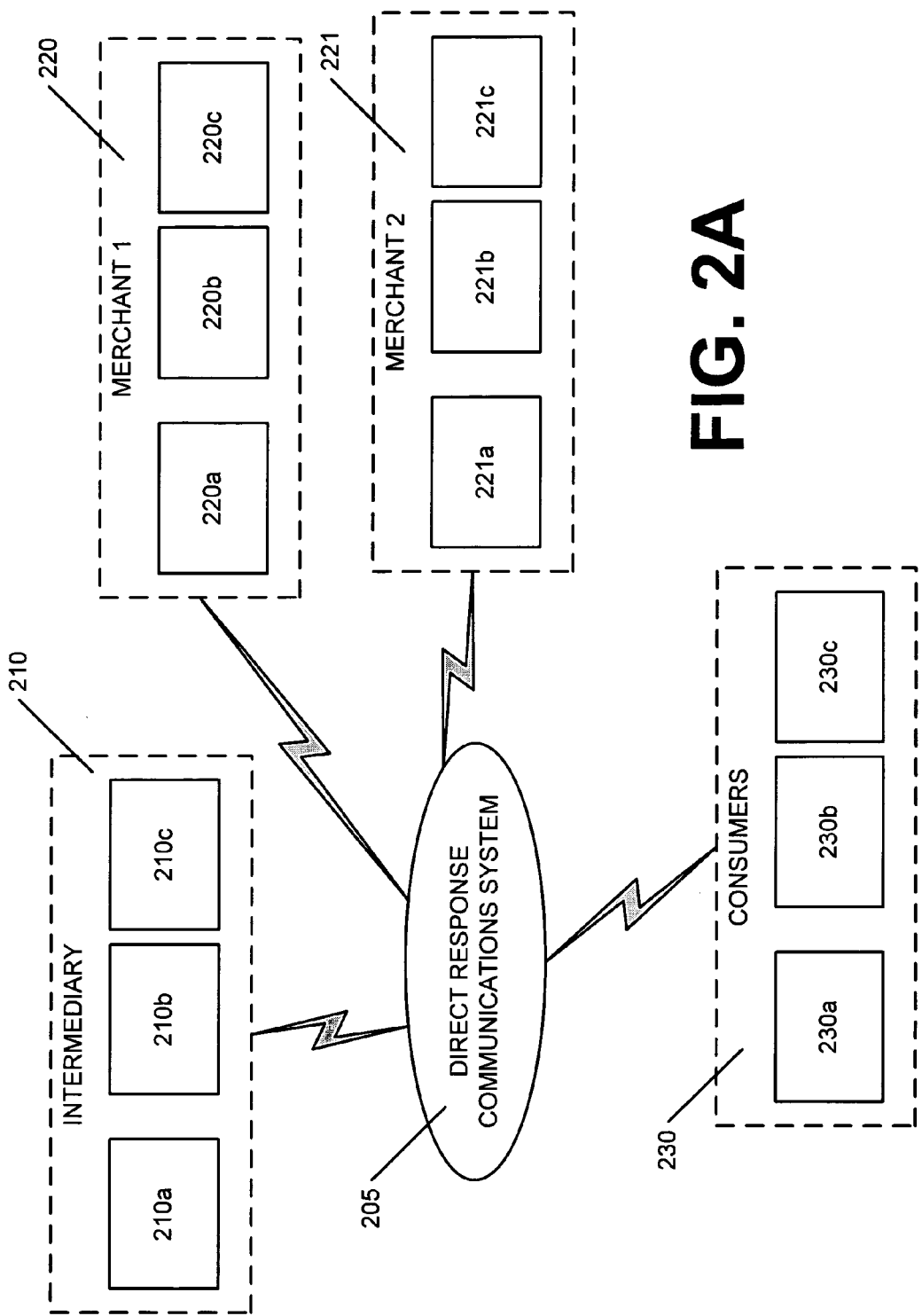
Figure 2B:
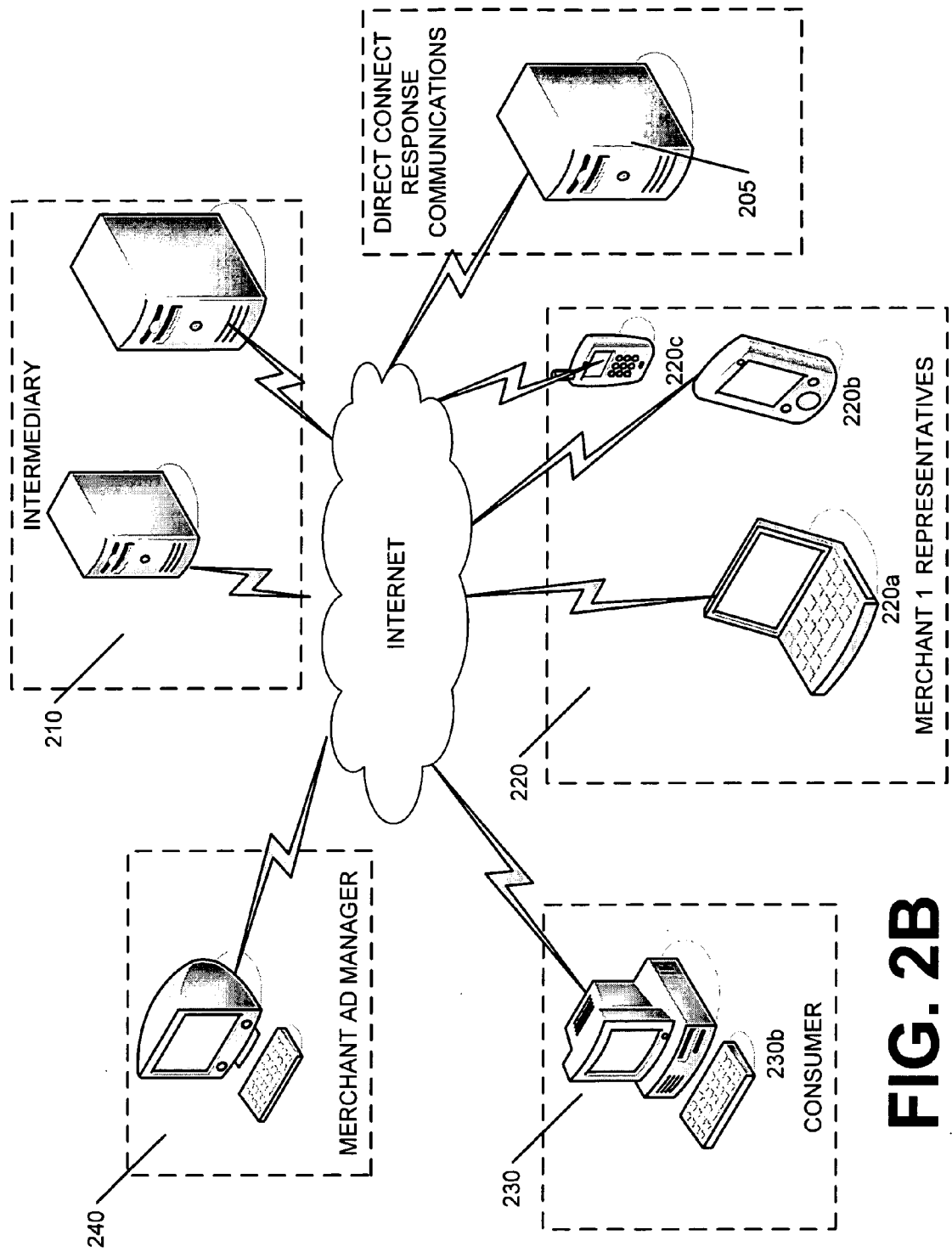

FIG. 2A and FIG. 2B are diagrams depicting one implementation of a system according to the present invention. A direct response communication system (DRCS) 205 is provided. The DRCS 205 may be configured to work in conjunction with an intermediary 210 so as to control 2-way communications between merchants 220, 221 and consumers 230. Each merchant 220 and 221 is provided a system to allow one or more representatives of the merchant 1 (220a, 220b, 220c) and merchant 2 (221a, 221b and 221c) to log-on to the system 205 for purposes of receiving and responding to inquiries from consumers 230a, 230b or 230c. Intermediary 210 may be, for example, a paid search provider, advertising publisher or other party.

FIG. 2B illustrates how the direct response communication system may be connected with the intermediary 210, merchants 220 and 221 and consumers 230 via a network, such as the Internet. Merchants may have one or more representatives log-in to the direct response communication system (DRCS) 205 via one of a variety of message capable devices (MCD). Message capable devices may include, for example, but are not limited to, personal computers, mobile and handheld devices, such as for example, interactive pagers, instant messaging devices, personal digital assistants (PDA), mobile telephones, smartphones, such as the Palm model Treo 650, Nokia model 9300 or RIM model Blackberry 8700g, and the like. Using these message capable devices, it is possible for a merchant representative to receive and respond to inquiries from online consumers via engaging in 2-way real time communications sessions established and controlled by the DRCS 205. From the initial request from the consumer, to the close of a 2-way communication session, a preferred embodiment of the DRCS 205 provides for the tracking and recording of all events and communication content.

Figure 2C:
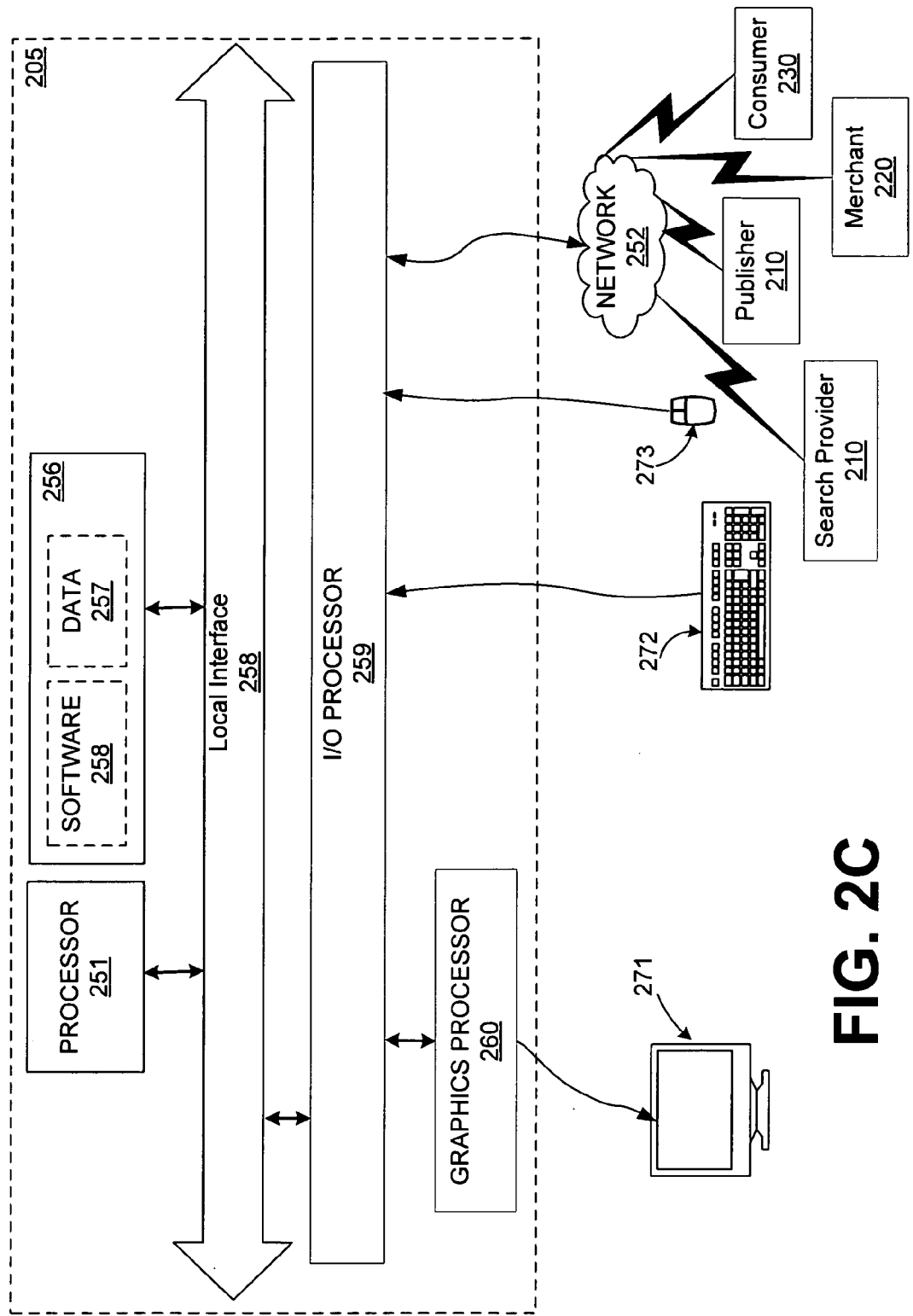

FIG. 2C illustrates an embodiment of a direct response communication system (DRCS) 205. In this embodiment, DRCS 205 includes a processor 251, a local interface bus 258, storage memory 256 for storing electronic format instructions (software) 258 and data 257. Storage memory 256 may include both volatile and non-volatile memory. An input/output interface 259 may be provided for interfacing with and communicating data received from/to, for example, a network 252, such as, for example, the Internet, or input devices such as a keyboard 272 or pointing device 273. Input/output interface 259 may also be configured to interface with, for example, graphics processor 260. Graphics processor 260 may be provided for carrying out the processing of graphic information for display in accordance with instructions from processor 251.

Processor 251 accesses data stored in memory 256 in accordance with, for example, software 258 stored on memory 256. Processor 251 may be configured to receive user input from an input device such as keyboard 320 or pointing device 325 and generate instructions and/or queries based upon the user input. Processor 251 may also be configured to place the command into a predetermined format, such as, for example, extensible mark-up language (XML) format, in accordance with software 258 stored in memory 256. Processor 251 may be further configured to forward data, instructions and/or queries to, for example, an intermediary 210, a consumer 230 and/or an advertiser/merchant 220 via a network 252. Additionally processor 251 may be configured to forward data, instructions and/or queries to, for example, an intermediary 210, a consumer 230 and/or an advertiser/merchant 220 via a network 252.

Figure 2D:
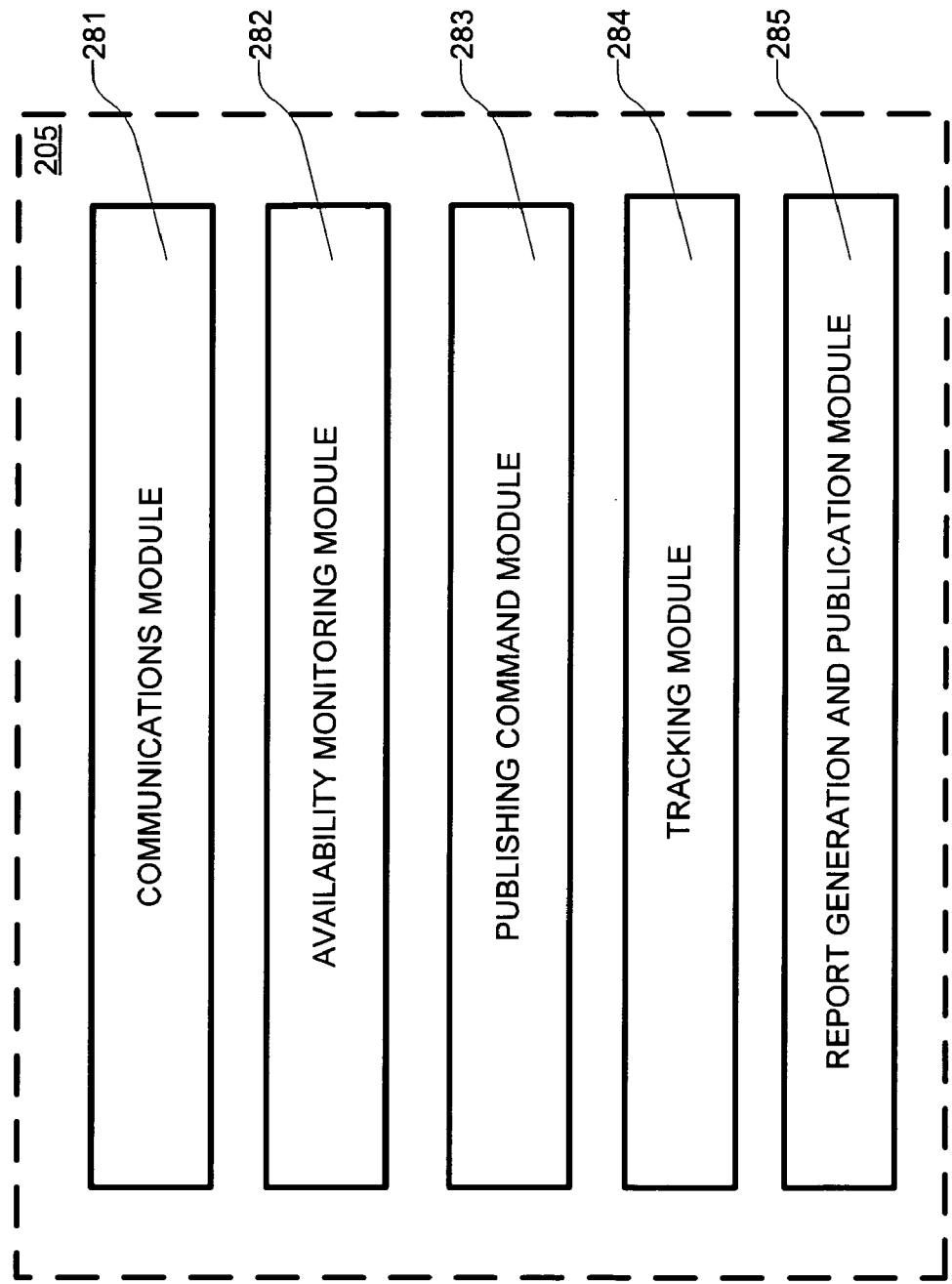

FIG. 2D-FIG. 2G are diagrams depicting further details of an embodiment of DRCS 205. FIG. 2D shows the DRCS 205 to include a communications module 281, and availability monitoring module 282, publishing command module 283, tracking module 284 and a report generation and publication module 285.

Figure 2E:
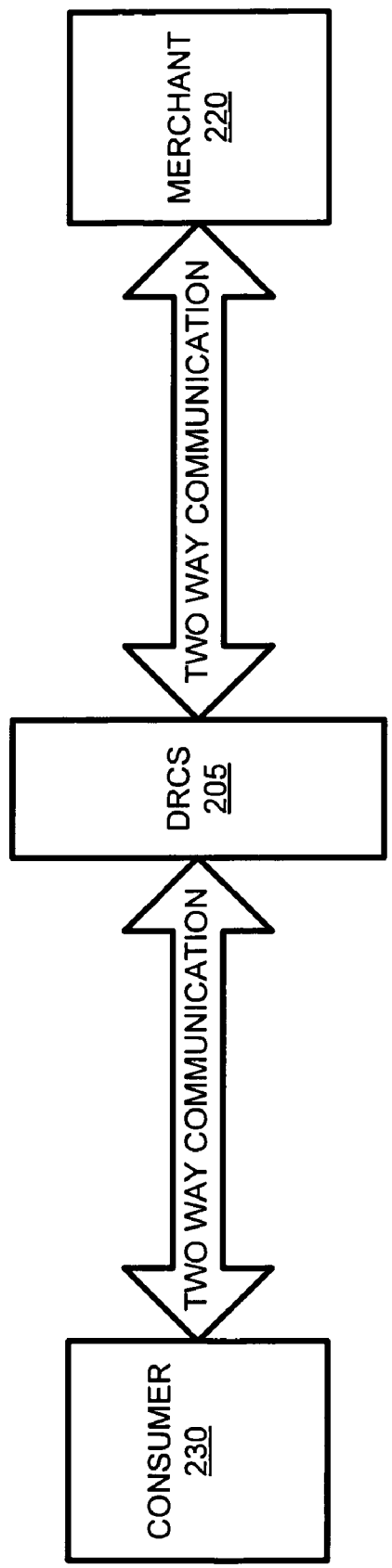
Figure 2F:
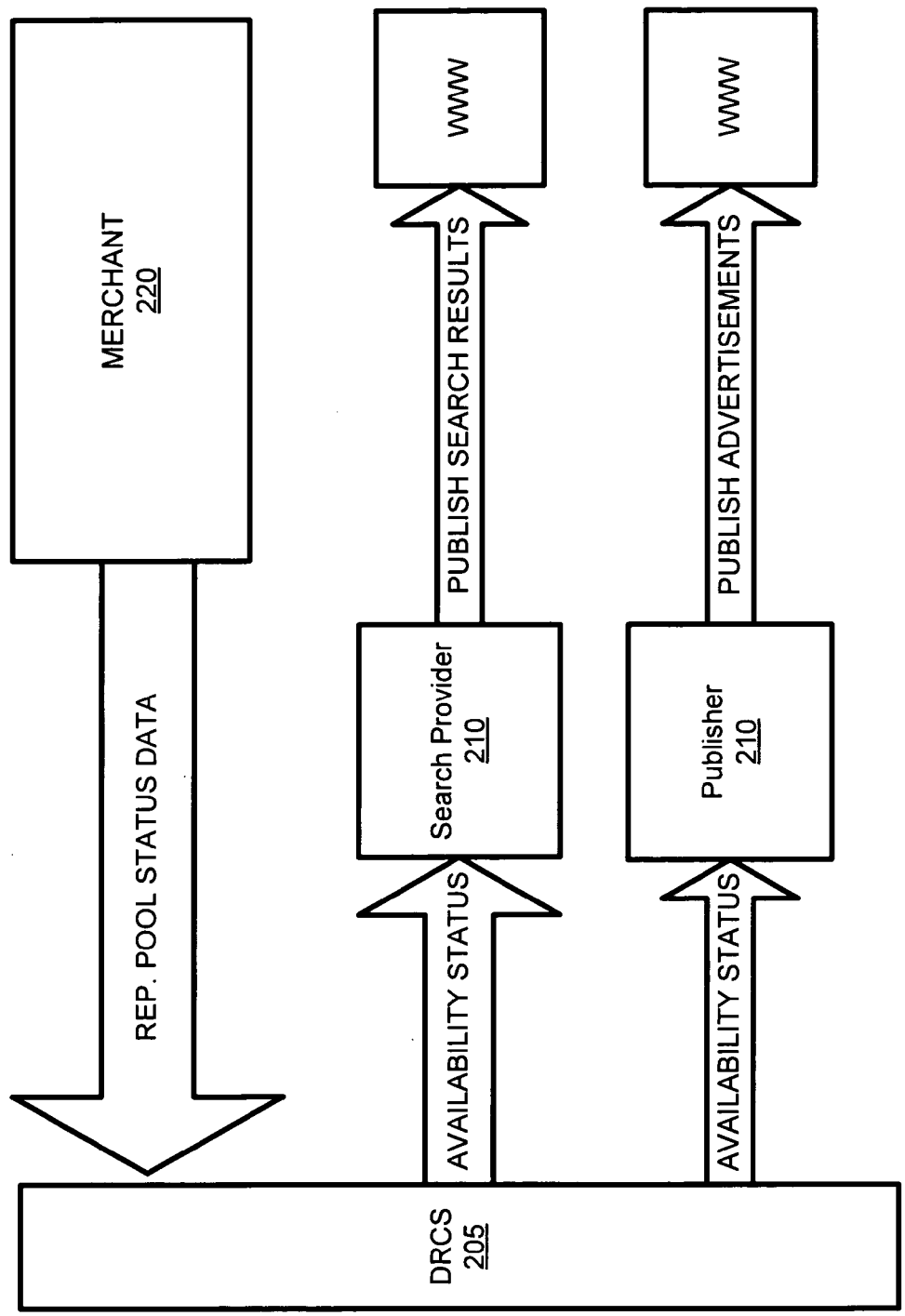
Figure 2G:
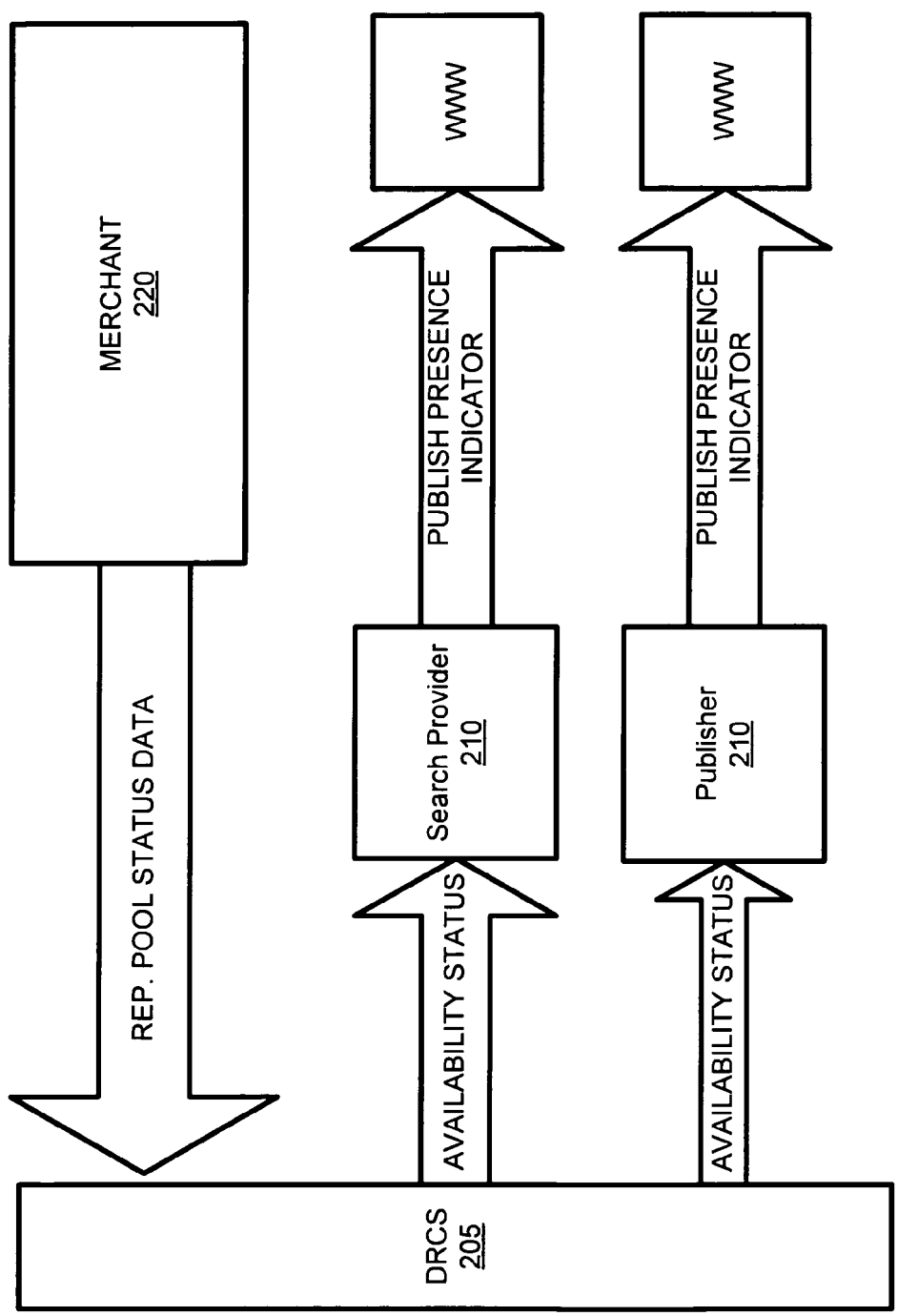

With reference to FIG. 2E-FIG. 2G communications module 281 is provided to establish and control 2-way real time communications sessions between a consumer 230 and a merchant 220. The communications module 281 may be configured to establish and control real time communications sessions such as, for example, text messages, created and exchanged via, for example, instant messenger technologies, SMS, MMS or internet relay chat (IRC). Further the communications module 281 may be configured to establish and control real time communications sessions such as, for example, audible voice communications via, for example, VoIP. Further, the communications module 281 may be configured to establish and control real time communications such as, for example, video chat.

The communications module 281 may be configured to cause data and instructions concerning a 2-way communications to be exchanged with, for example, a consumer message capable device (MCD) to display, for example appropriate communications windows and controls on the consumer MCD. The communications module 281 may be configured to cause data and instructions concerning a 2-way communications to be exchanged with a consumer MCD to display appropriate communications windows and controls on the consumer MCD. Similarly, the communications module 281 may be configured to cause data and instructions concerning a 2-way communications to be exchanged with, for example, a merchant via a message capable device (MCD) to display, for example appropriate communications windows and controls on a MCD associated with/used by a merchant representative. The communications module 281 may also be configured to cause data and instructions concerning a 2-way communications to be exchanged with a consumer MCD to display appropriate communications windows and controls on the consumer MCD.

Figure 3A:
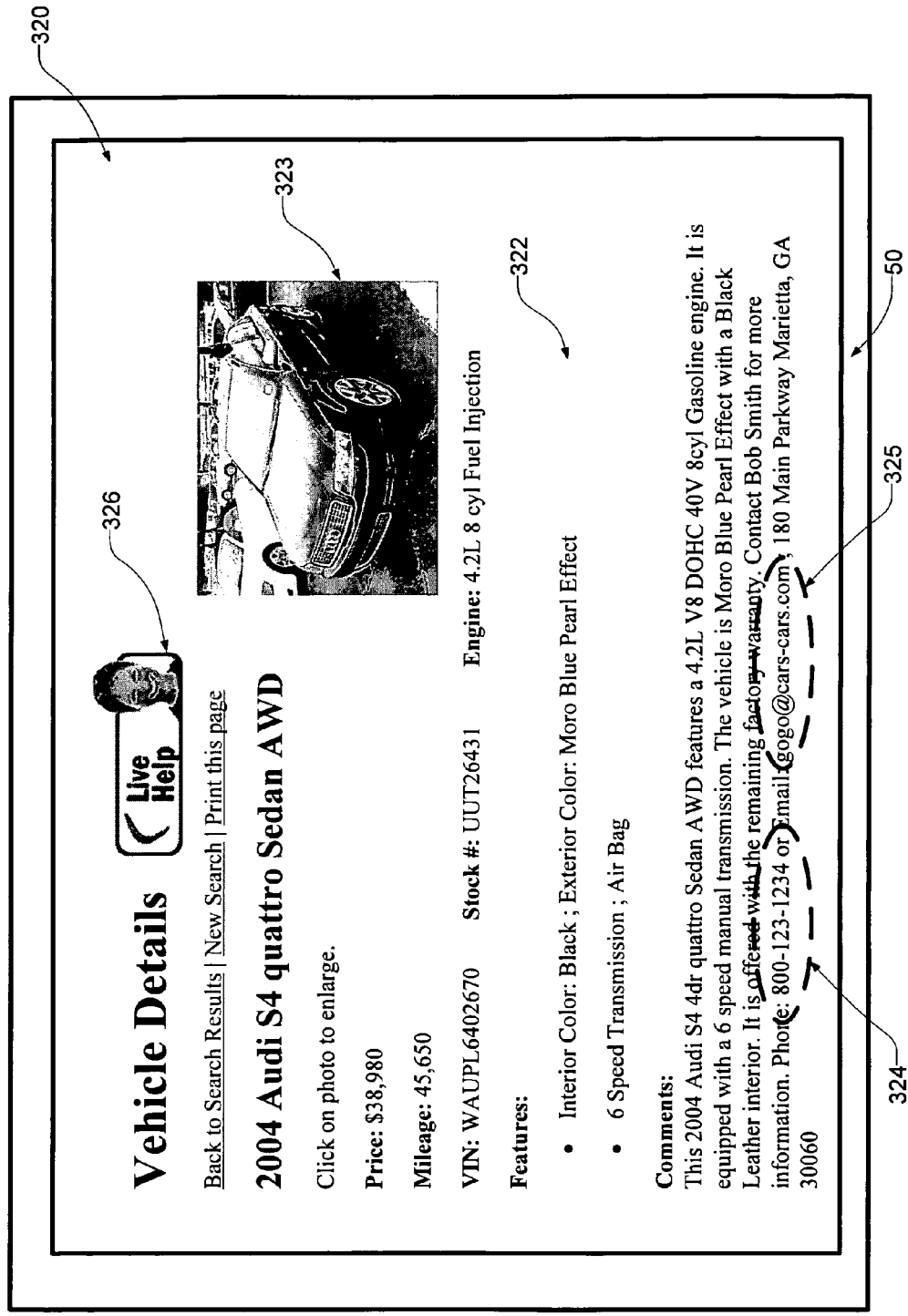
Figure 3B:
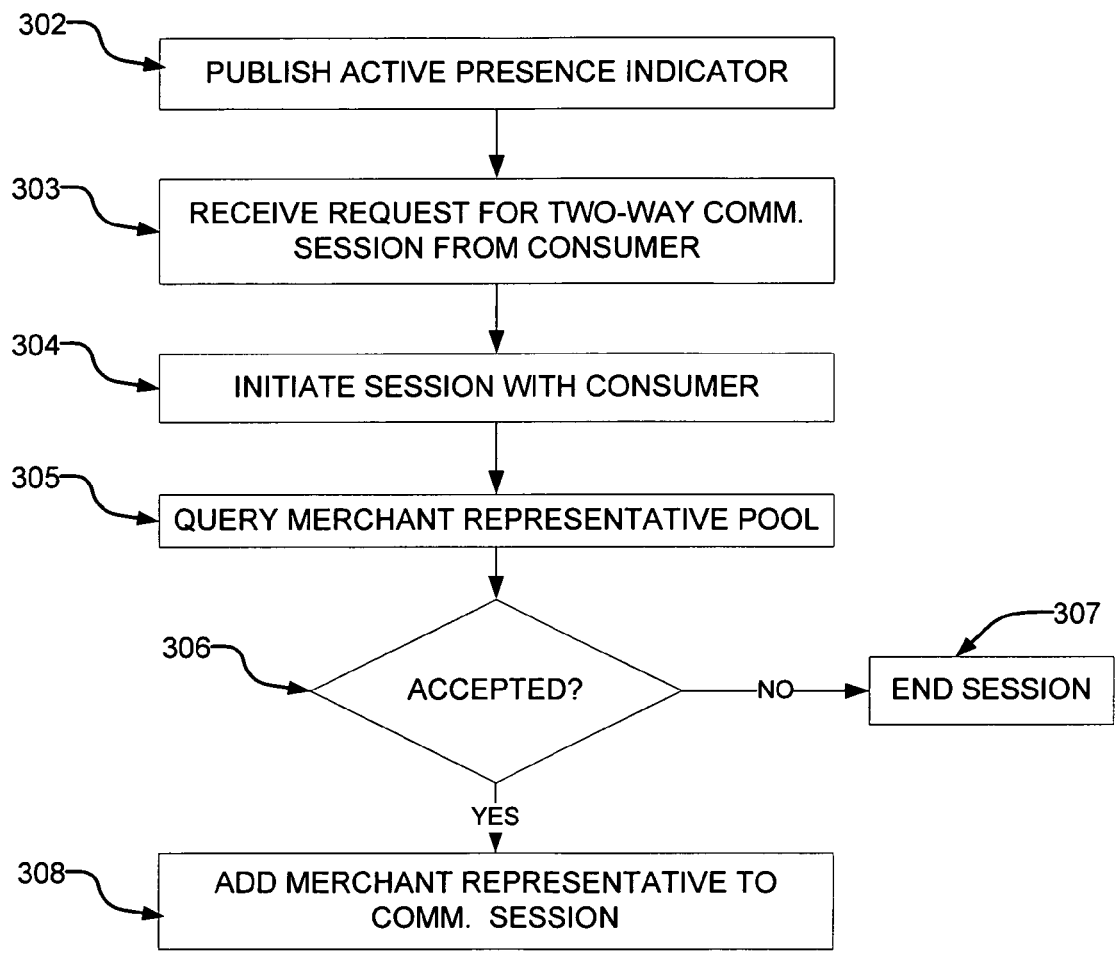
Figure 3C:
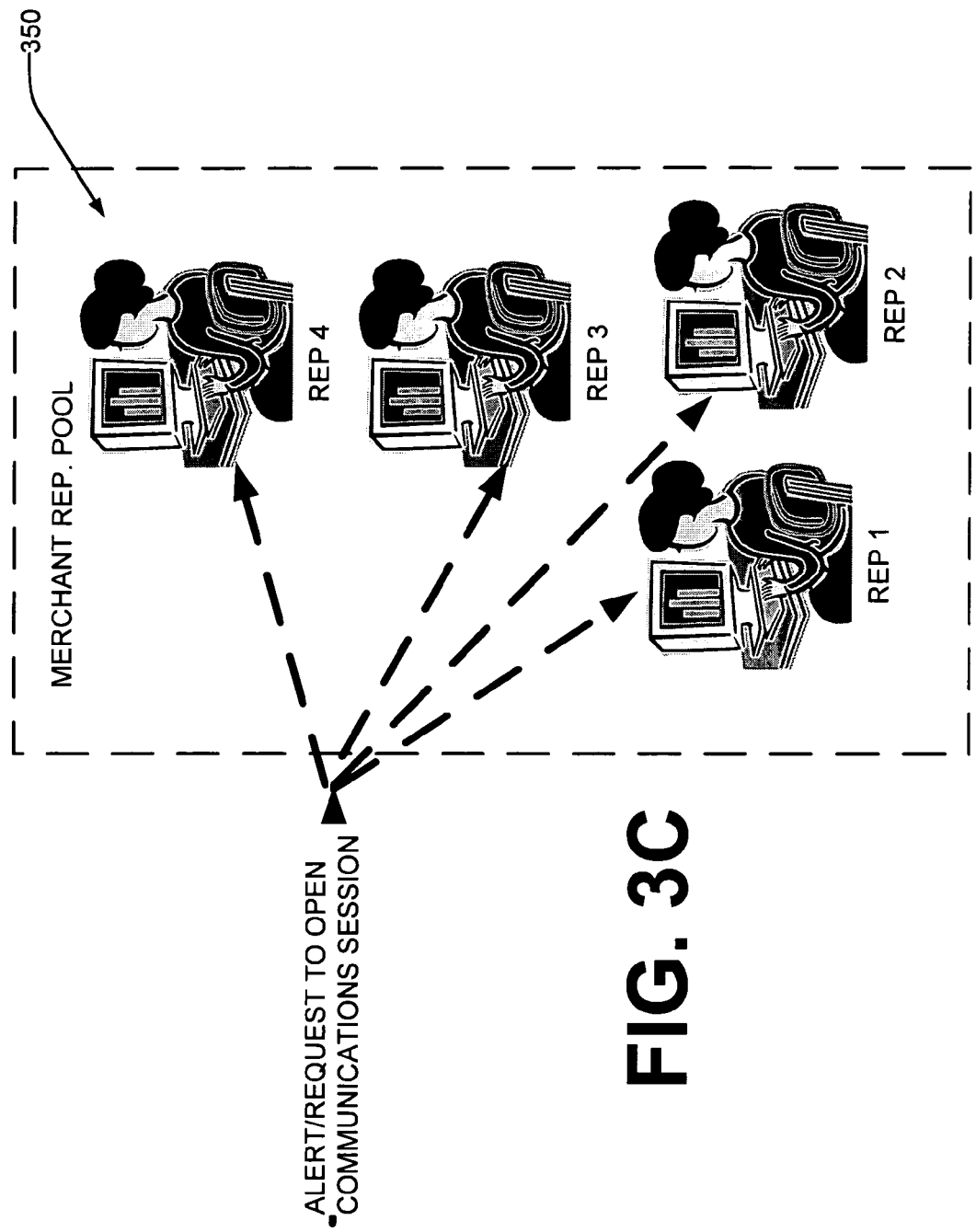

In a further embodiment, the communications module 281 is configured to send an alert or inquiry to a merchant 220, via sending the alert or inquiry, over a network 252 (FIG. 2C) to one or more MCD devices associated with or otherwise used by one or more merchant representatives within a given merchant representative pool (FIG. 3C). The alert or inquiry is generated upon receipt of a request from a consumer to initiate a 2-way communications session with the merchant.

With reference to FIG. 2F and FIG. 2G, availability monitoring module 282 is provided to monitor the status of various predefined factors (status data) relevant to one or more merchant representatives within a given merchant representative pool. Based upon the status of various predefined factors, the availability monitoring module 282 will determine, based upon predetermined criteria, the "availability" of a merchant. In one embodiment, a merchant is deemed available in real-time, if it is determined that the merchant (via a merchant representative) is likely to be able to accept a request for and in engage in a 2-way communication, in real time, with a consumer concerning an item advertised by the merchant online. The availability status may then be reported to one or more intermediaries 210, such as, for example, online advertising publishers and/or online search providers or the like. In turn, the intermediaries 210 may control whether or not an advertisement or presence indicator will be served up for publication at a given time, based upon the availability status of a given merchant as determined and indicated by the availability monitoring module 282.

Publishing command module 283 may be configured to receive the availability status of a merchant as determined by the availability monitoring module 282. The publishing command module may be further configured to determine whether or not a given availability status meets certain criteria set by, for example, an advertiser or publisher. For example, the publishing command module 283 may determine, given the availability status of a merchant, whether or not the probability of the merchant establishing a 2-way communication session with a consumer is above or below a preset threshold. If the probability is above the threshold, for example, the publishing command module 283 may be configured to report the availability status to one or more intermediaries 210, such as, for example, online advertising publishers and/or online search providers or the like. In turn the intermediaries 210 may determine and control whether or not an advertisement or presence indicator will be served up for publication at a given time, based upon the availability status of a given merchant as determined and indicated by the availability monitoring module 282. Alternatively, the publishing command module 283 may be configured to issue a command to publish or not publish to an intermediary 210, based upon certain predetermined criteria established by, for example, the merchant 220 or an intermediary 210.

Tracking module 284 is provided and configured to monitor and record certain predefined events or actions relevant to an advertisement and/or initiation of a 2-way communication session, as well as, for example the content of any 2-way communication. It may also be configured to cause a request for consumer information to be issued and record the consumer information provided.

Report generation and publication module 285 is provided to generate and/or publish one or more reports relevant to data and events tracked and/or recorded by the tracking module 284. These reports may be configured to meet the needs/ desires of, for example, intermediaries, such as, publishers, online search providers, merchants or any other party. Reports may be published via printing or serving up online to a limited access site. Further, reports may be published in real time to reflect the current state of factors concerning a given merchant or merchant advertisement.

Figure 2H:
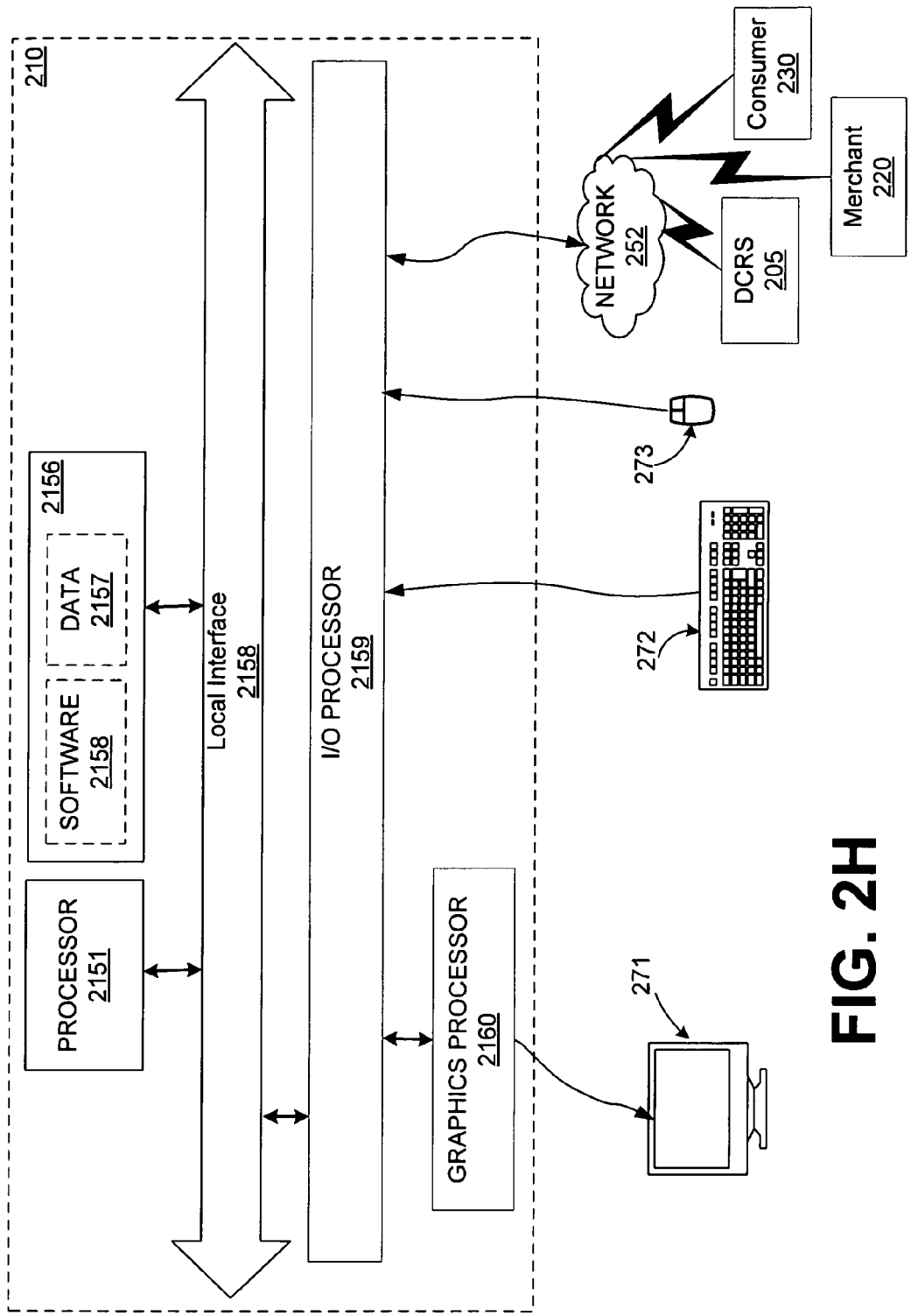
Figure 21:
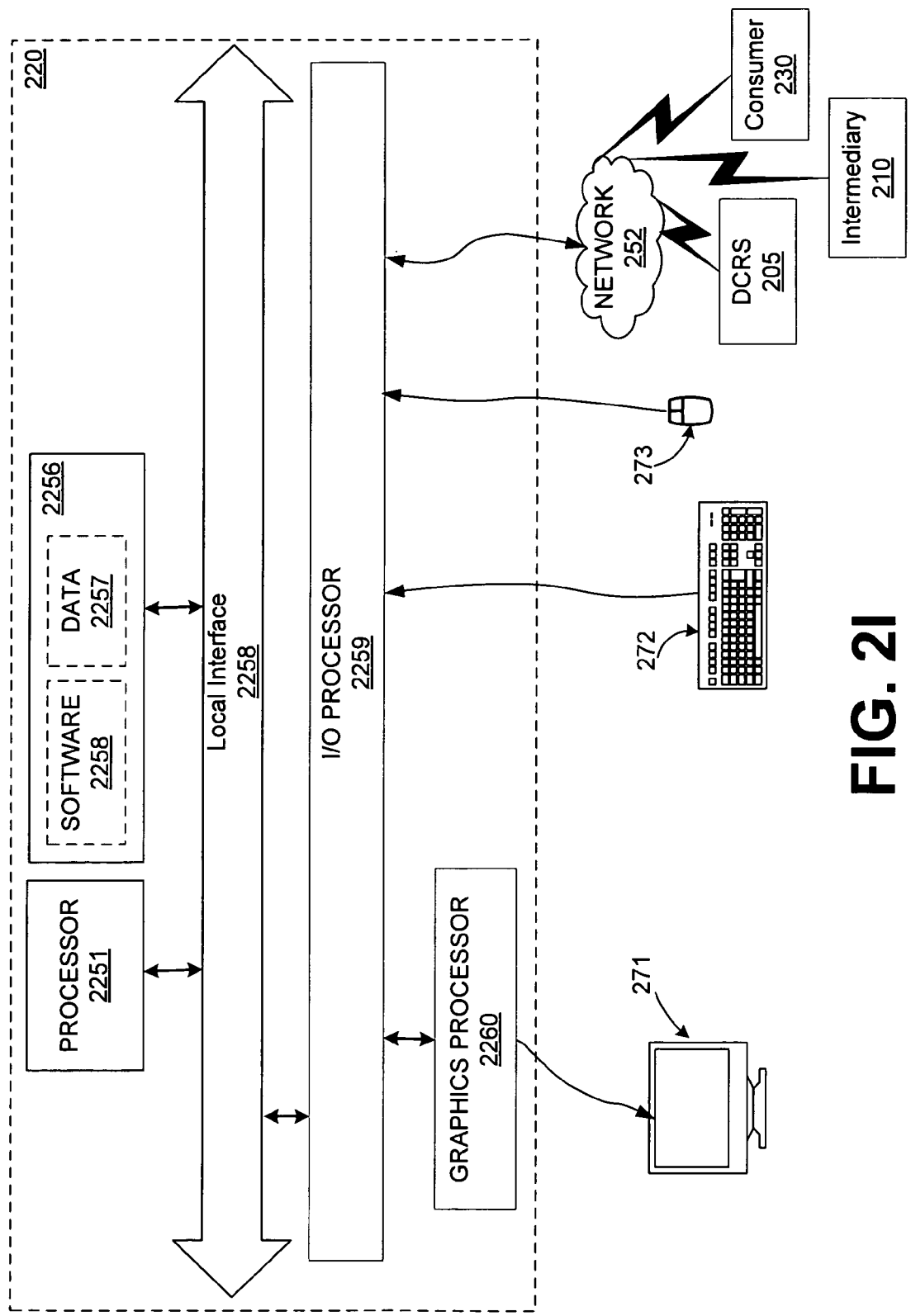

FIG. 2H illustrates an embodiment of an intermediary system 210. In this embodiment, intermediary 210 includes a processor 2151, a local interface bus 2158, storage memory 2156 for storing electronic format instructions (software) 2158 and data 2157. Storage memory 2156 may include both volatile and non-volatile memory. An input/output interface 2159 may be provided for interfacing with and communicating data received from/to, for example, a network 2152, such as, for example, the Internet, or input devices such as a keyboard 272 or pointing device 273. Input/output interface 2159 may also be configured to interface with, for example, graphics processor 2160. Graphics processor 2160 may be provided for carrying out the processing of graphic information for display in accordance with instructions from processor 2151.

Processor 2151 accesses data stored in memory 2156 in accordance with, for example, software 2158 stored on memory 2156. Processor 2151 may be configured to receive user input from an input device such as keyboard 272 or pointing device 273 and generate instructions and/or queries based upon the user input. Processor 2151 may also be configured to place the command into a predetermined format, such as, for example, extensible mark-up language (XML) format, in accordance with software 2158 stored in memory 2156. Processor 2151 may be further configured to forward data, instructions and/or queries to, for example, a consumer 230 and/or an advertiser/merchant 220 via a network 252. Additionally processor 2151 may be configured to forward data, instructions and/or queries to, for example, an consumer 230 and/or an advertiser/merchant 220 via a network 252.

The software 2158 may include, for example, one or more applications, configured to carry out various processes or process steps according to the methodology depicted by the flowcharts of FIGS. 3B, 4, 5A, 5D, 6A, 5B, 6C, 7A, 7B and/or 7C.

In a preferred embodiment, the intermediary system 210 is configured to receive status data concerning a pool of merchant representatives and to determine whether such status data indicates that it is likely that a merchant representative will be able to accept and engage in a two-way real time communication with a consumer if they should initiate a request for a two-way real time communication. In a further embodiment the intermediary system 210 is configured to receive an indicator of merchant/advertiser availability. In another embodiment, the intermediary system 210 is configured to determine the availability of a merchant based upon status data pertaining to a given pool of merchant representatives. In yet a further embodiment the intermediary system 210 may be configured to publish an advertisement online at a given time based upon the availability of a merchant or an indication of the availability of a merchant. In yet a further embodiment the intermediary system 210 may be configured to publish a presence indicator in conjunction with an online advertisement based upon the availability of a merchant or an indication of the availability of a merchant. In yet a further embodiment the intermediary system 210 may be configured to publish search results inclusive of a given online advertisement based upon the availability of a merchant or an indication of the availability of a merchant. In yet a further embodiment the intermediary system 210 may be configured to publish a script, as a component of the advertisement, that requests the DRCS 205 to dynamically publish a presence indicator on behalf of the intermediary 210.

The intermediary system 210 may be configured to request data from, for example, a merchant 220, a consumer 230 and/or a DRCS 205. Similarly, the intermediary system 210 may be configured to send and/or receive data and/or queries from, for example, a consumer 230. The intermediary system 210 can be implemented in hardware, software, firmware, or a combination thereof. In a preferred embodiment(s), the intermediary system 210 is implemented in software or firmware that is stored in a memory and that is executed by a suitable instruction execution system. If implemented in hardware, as in an alternative embodiment, the intermediary system 210 can be implemented with any one or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow charts of FIGS. 3B, 4, 5A, 5D, 6A, 5B, 6C, 7A, 7B and/or 7C show the architecture, functionality, and operation of possible implementations of the software 2158 (FIG. 2H). In this regard, each block represents a module, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in the reverse order, depending upon the functionality involved. The software program stored as software 2158, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

FIG. 2I illustrates an embodiment of a MCD associated with merchant 220 (merchant system 220). In this embodiment, merchant system 220 includes a processor 2251, a local interface bus 2258, storage memory 2256 for storing electronic format instructions (software) 2258 and data 2257. Storage memory 2256 may include both volatile and non-volatile memory. An input/output interface 2259 may be provided for interfacing with and communicating data received from/to, for example, a network 2252, such as, for example, the Internet, or input devices such as a keyboard 272 or pointing device 273. Input/output interface 2259 may also be configured to interface with, for example, graphics processor 2260. Graphics processor 2260 may be provided for carrying out the processing of graphic information for display in accordance with instructions from processor 2251.

Processor 2251 accesses data stored in memory 2256 in accordance with, for example, software 2258 stored on memory 2256. Processor 2251 may be configured to receive user input from an input device such as keyboard 272 or pointing device 273 and generate instructions and/or queries based upon the user input. Processor 2251 may also be configured to place the command into a predetermined format, such as, for example, extensible mark-up language (XML) format, in accordance with software 2258 stored in memory 2256. Processor 2251 may be further configured to forward data, instructions and/or queries to, for example, a consumer 230 and/or an intermediary 220 or DRCS 205 via a network 252. Additionally processor 2251 may be configured to forward data, instructions and/or queries to, for example, a consumer 230 and/or an intermediary 220 or DRCS 205 via a network 252.

The software 2258 may include, for example, one or more applications, configured to carry out various processes or process steps according to the methodology depicted by the flowcharts of FIGS. 3B, 4, 5A, 5D, 6A, 5B, 6C, 7A, 7B and/or 7C.

In a preferred embodiment, the merchant system 230 is configured to receive alerts or queries from a DRCS 205 and to allow a user to engage in a two-way real time communication with, for example, a consumer. In a further embodiment the merchant system 230 is configured to accept a request from a consumer for a two-way communication session. The merchant system 230 may be configured to allow for two-way communications sessions that are carried out via exchange of one or more text messages, such as SMS or instant messaging. Further merchant system 230 may be configured to allow for a two-way communications session carried out via a two way voice session.

One aspect of the invention provides a means for a consumer viewing an advertisement published online to obtain answers to questions they may have of the merchant by initiating/requesting a 2-way real time communications session with a representative of the merchant (merchant representative).

In use, one implementation of the present invention would allow a consumer 232 to access, for example, an online search engine provided by an intermediary 210 and enter a search query to gather information pertaining to an item of interest. In turn, the search engine will return a listing of search results (search results) relevant to the search query provided by the consumer 232. The list of search results will typically be in a summary or limited information format and include a hyperlink that would allow a consumer to access further details concerning a particular item that are published on another web page, by clicking on the hyper-link.

In the case of online advertisements, by clicking on a hyper-link in the list of the search results, the consumer could access the full advertisement that contains, for example, details concerning an advertised item/product of interest. In one implementation of the invention, the advertisement would include a presence indicator that could be activated (clicked) to initiate a request for assistance (via, for example, a 2-way communications session).

In a preferred embodiment, a "presence indicator" is incorporated into and published as a part of an advertisement. The presence indicator may be configured as an active hyper-link, that when activated (clicked on) will send a request to the advertiser associated with a particular advertisement to engage in a 2-way communication. Alternatively, a presence indicator may be published in conjunction with search results.

FIG. 3A is a diagram depicting a published advertisement 320. In addition to textual information 322 and photograph 323 describing the advertised item, this advertisement 320 includes a presence indicator 326 that is displayed as an active icon. In this example, the presence indicator includes the text "Live Help" to let a consumer known that they may obtain additional help about the item by clicking on the icon.

The 2-way communications mode may be, for example, a form of instant messaging (IM) in which textual messages are exchanged over a network in a back and forth fashion, via use of MCDs. There are several known forms of instant messaging that have been productized and implemented by companies such as, for example, Mirabillis®, America Online (AOL)®, Google®, Verichat® and Yahoo!®.

FIG. 3C is a diagram depicting how a request may be simultaneously broadcast to multiple representatives (REP 1-REP 4) within a pool of advertiser representatives. Unlike typical instant messaging systems, the present invention is configured to cause a pool of people (advertiser representatives), unknown and unidentifiable to the consumer, to be alerted/paged via a MCD when a consumer initiates a 2-way communications session. The page will preferably be broadcast to all representatives within the pool and can be accepted by which ever representative is able to accept the page first.

By allowing an alert to be simultaneously sent to multiple representatives of the merchant advertiser when a consumer makes an inquiry, the chances that the merchant will be able to actually respond to the consumer inquiry are greatly increased, since the chances of one of many people being able to respond at any given time are greater than the chances that any single person will be able to respond at any given time. In this way the value of the advertisement can be increased.

The size of the representative pool may vary by merchant, or thru out the day at any given merchant. Of course, it is not necessary that there be more than one person in the pool of representatives, however, in general, the more the better since it makes it more likely that someone associated with the merchant can respond promptly.

A 2-way communications session may be initiated by a consumer by clicking on a presence indicator. The presence indicator may be, for example, a predetermined hyper-link or active icon (contact link) that is displayed in conjunction with a given advertisement. FIG. 3B is a flowchart describing an embodiment of the method the method of the present invention. With reference to FIG. 3A and FIG. 3B, a presence indicator 326 is published (302). This presence indicator is preferably included within the bounds of the advertisement for a given item.

The system may be configured to simultaneously alert a pool of representatives of the merchant of a pending inquiry. The first representative in the pool to accept the inquiry will be the person who communicates with the consumer via the DRCS 205. The representative may or may not use the same communications means (text chat, VoIP, SMS, MMS, etc.) engaged by the consumer. In those instances where the consumer and the merchant representative are using dissimilar communication means, the DRCS 205 may provide the requisite translation between the dissimilar communication means.

A consumer may initiate a request for a 2-way communications session by clicking on a presence indicator published in connection with a given advertisement. The request is then sent to the DRCS 205. In turn, the DRCS 205 receives the request (302) and initiates a 2-way communications session with the consumer (304). With reference to FIG. 3C, a query may then be, for example, simultaneously sent to one or more various message capable devices MCD associated with, or otherwise used by one or more representatives of the merchant/advertiser (merchant representative pool 350) (305) to see is anyone is able to engage in the requested 2-way communications session. The first representative in the pool to accept the inquiry will be the person who responds to the DRCS 205 using their respective MCD.

If the query is accepted by a representative (306), the representative accepting the query will be added to the 2-way communications session (308) at which point the representative can communicate with the consumer via, for example, exchanging textual messages. If the query is not accepted by a representative, the communications session is terminated (307).

Once a request is received from a consumer, an alert may alternatively be sent sequentially to each merchant representative within the representative pool. If the first representative does not respond, the next representative in the pool may be sent the alert. This can continue until the alert is answered or all of the representatives within the pool have failed to respond.

In one embodiment, the DRCS 205 integrates with a web site published by an intermediary 210 via use of, for example, HTML anchor tags that are incorporated into, for example, underlying HTML scripting associated with the web site and associated web pages.

These anchor tags may be provided for one or more entry points into the system and/or functionality provided or established by the DRCS 205 system. These entry points may be configured to accommodate, for example, two-way communication sessions, such as real time text messaging, active e-mail or click-to-initiate a telephone call, VoIP call or other voice communication.

These anchor tags will preferably share a common structure for each entry point. In a preferred embodiment, the anchor tags may be configured to include, for example, certain fixed required components, certain variable required components, as well as optional lead context components. TABLE 2 is a sets out further details of the fixed required components, variable required components and optional lead content components, for one possible implementation of the present invention.

TABLE 2

| Anchor Tag Components | |
|---|---|
| Component | Description |
| Fixed Required Components | |
| Onclick window open | Specifies the application entry point for ContactAtOnce |
| ProviderId | Uniquely identifies the Online Advertising Publisher |
| Variable Required Components | |
| MerchantId | Uniquely identifies the Dealer location |
| PlacementId | Identifies a specific location that a presence indicator will be placed. |

TABLE 2-continued

| Anchor Tag Components | |
|---|---|
| Component | Description |
| Optional Lead Context Components | |
| Location | Search Location |
| Price Range | Price Range Low of Search Low & High |
| model | Product model or ID |
| brand | Manufacturer/Product Brand |

Optional lead context components may be configured to pass lead related information to, for example, a merchant/advertiser upon receipt of two-way communication request from a consumer. Receipt of lead related information and delivery of such information to merchant/advertiser may be tracked and reported by the DRCS 205.

FIG. 3D is a diagram illustrating one example of scripting that may be used to incorporate anchor tags on a published web site for providing the functionality of instant messaging. In a preferred embodiment, images chosen to serve as, for example, presence indicators will not be loaded on the intermediary server system. The <img src> component will dynamically render a "presence indicator" based on the real-time availability of the merchant/advertiser 220, as determined by, for example, the DRCS 205. An image displayed (rendered) when an merchant/advertiser 220 is "online" (available) may be different than the image rendered when the merchant/advertiser 230 is "offline" (not available). An argument provided in the javascript, for example, for launching a communication session window (conversation window) for the window name (the onclick of the <A> element) will preferably be a null value. Preferably the URL for the published web site will not be html encoded. More particularly, the &'s separating query arguments will not be converted to &.

FIG. 3E is a diagram illustrating one example of scripting that may be used to incorporate anchor tags on a published web site for providing the functionality of active e-mail. In a preferred embodiment, chosen images will not be loaded on the intermediary server system. FIG. 3F is a diagram illustrating one example of scripting that may be used to incorporate anchor tags on a published web site for providing the functionality of click-to-call wherein a consumer may initiate a two-way voice communication session via clicking on an icon. In a preferred embodiment, chosen images will not be loaded on the intermediary server system.

Presence Indicator Displayed Based on Availability

A further aspect of the invention takes into account the availability of a merchant to receive and respond to consumer inquiries in determining whether or not to publish a presence indicator in association with an advertisement. In one embodiment a contact link is used as not only a means for initiating a 2-way communication sessions with a merchant, but also as a presence indicator which indicates that the merchant is available to receive and respond to inquires from consumers. When the merchant is available, the contact link is displayed in connection with the advertisement. When the merchant is not available, the contact link will not be displayed, thus preventing consumers from attempting to initiate a 2-way communication session that has no chance of completion due to the fact that the merchant is not available to receive it, nor respond.

An indication of the merchants' availability may be provided in several ways. In one embodiment, if the system determines that the merchant is "available", the system may have a presence indicator published within the boundaries of the online advertisement. This presence indicator may be, for example, an active icon or web hyper-link that, when clicked on, causes a request for a 2-way communication session to be sent to the DRCS 205. Preferably, the presence indicator will include, or otherwise be made up of, some type of textual, graphic or symbolic information to let a consumer viewing the advertisement know that they may obtain additional information by "clicking" on the presence indicator.

Figure 4:
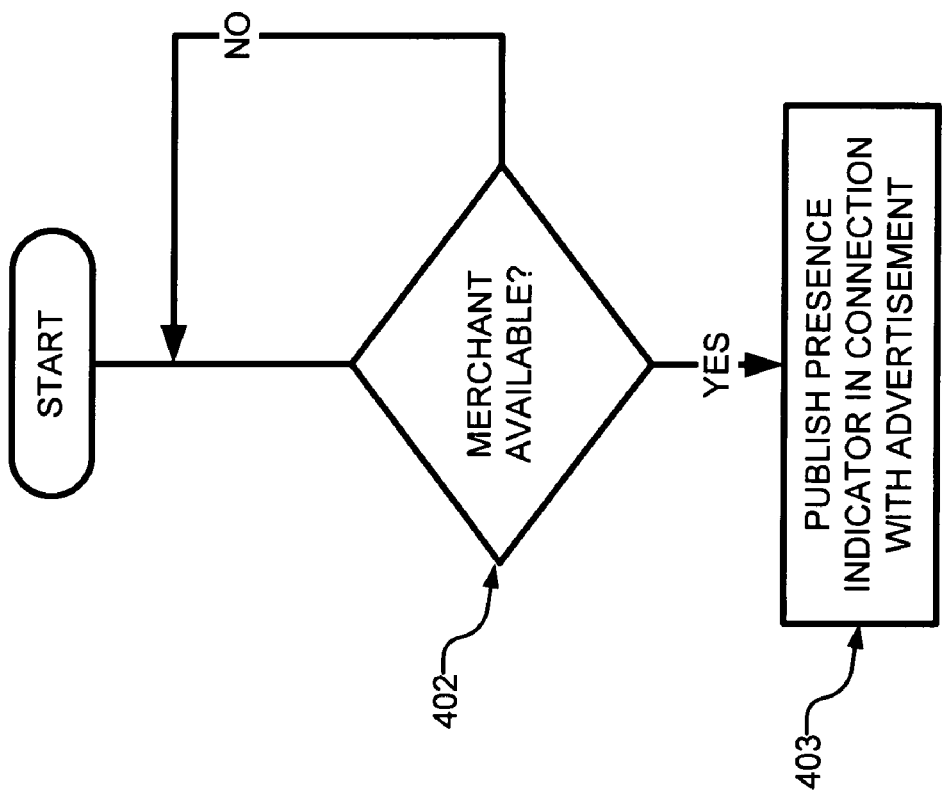
FIG. 4 is a diagram showing a flowchart generally depicting details of publishing a presence indicator based upon the availability of a merchant.

FIG. 4 is a diagram showing a flowchart describing one aspect of the methodology of the present invention. Where an advertisement has been requested for display, the system will determine whether or not that merchant associated with the advertisement is available to respond to inquiries/request for 2-way communications from a consumer (402). If it is determined that the merchant is available, a presence indicator will be published in connection with the merchants advertisement (403). If it is determined that the merchant is not available, a presence indicator will not be published in connection with the merchant advertisement. In another embodiment when the merchant is not available, the presence icon will include, or otherwise be made up of, some type of textual, graphic or symbolic information to let a consumer viewing the advertisement know that the merchant is not currently available. In this way, it is possible to avoid having consumers make requests for communications sessions when it is determined that no one associated with the merchant will be able to respond.

Figure 5A:
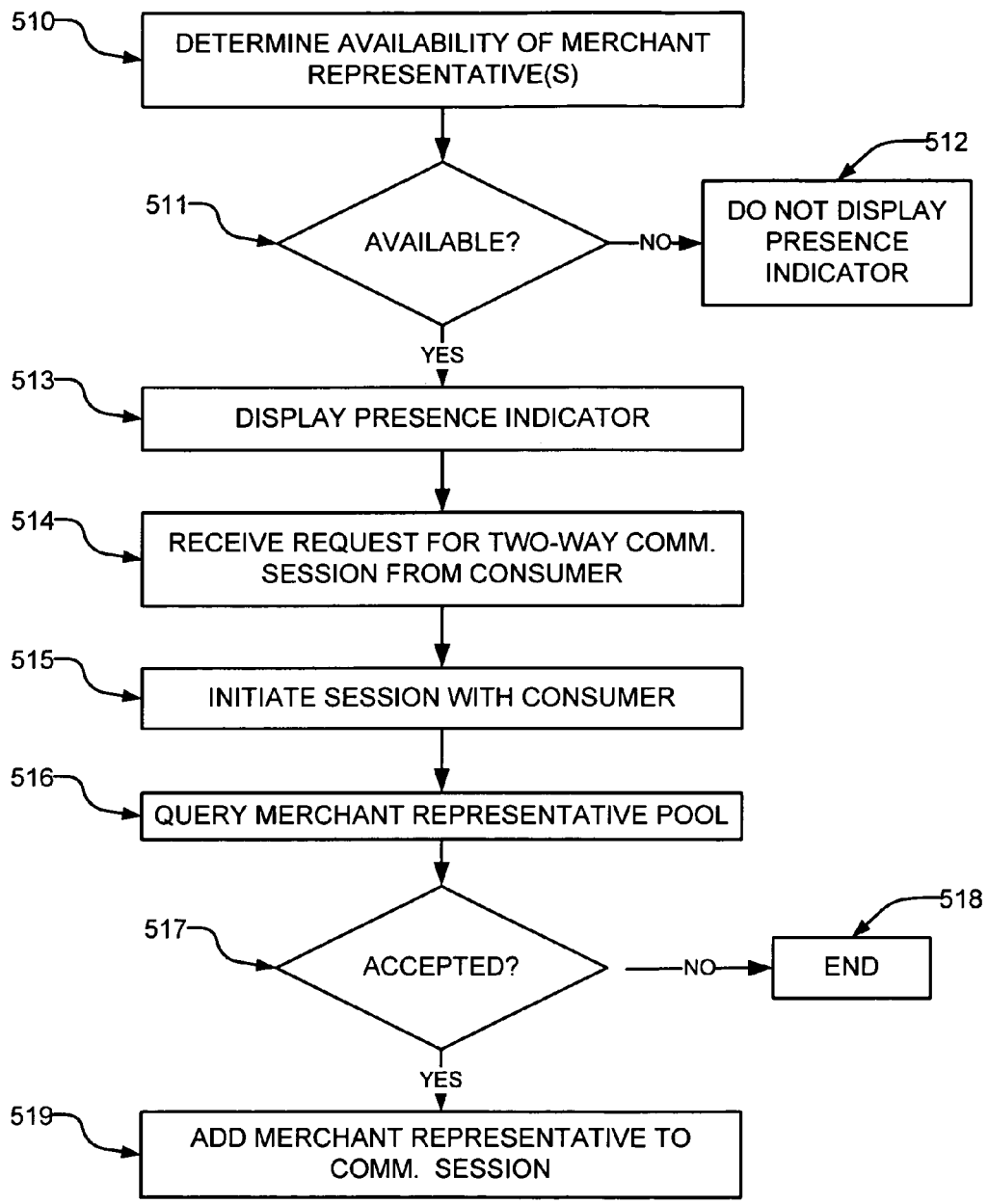
FIG. 5A-FIG. 5F are diagrams depicting a process of receiving a request for and initiating a 2-way real time communications session with a consumer.
Figure 5B:
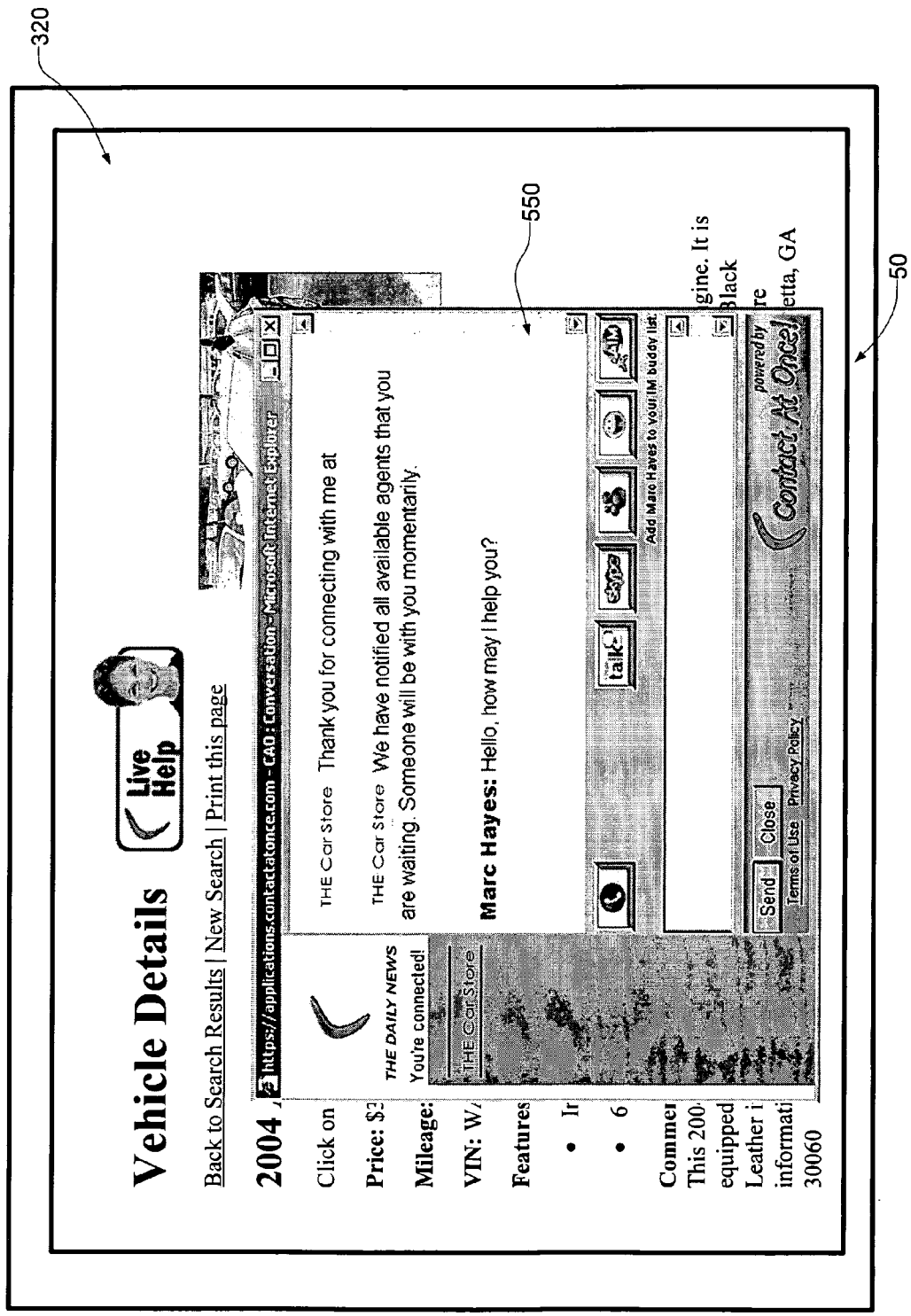

FIG. 5A is a diagram describing a further embodiment of the methodology of the invention in which the availability of the merchant, or a representative of the merchant, to actually receive and respond to consumer inquires in real-time is taken into account. A merchant's availability is determined (511). Availability may be determined based on the status of one or more predetermined factors, such as, for example, whether or not a representative is actually logged into the DRCS 205 system. If it is determined that the merchant is available, the DRCS 205 system will cause a presence indicator to be displayed in connection with an advertisement (513) when the advertisement is served/published for consumer viewing. When a consumer views the advertisement, the presence indicator will preferably be configured so that the consumer will understand that they may obtain additional information or help by clicking on the presence indicator or a related specified hyper-link. An example of a presence indicator 326 published in connection with an advertisement has been discussed above with respect FIG. 3A. When the presence indicator or specified related hyper-link is clicked (activated), it causes the DRCS 205 system to issue a request for a 2-way communication session to the advertiser. The advertiser receives the request for 2-way communication (514). A 2-way communication session is initiated with the consumer (515). The session is initiated by generating a session window 550 on the consumers MDC display window 320 as depicted in FIG. 5B. A request is issued to a pool of merchant representatives (516) to engage in the 2-way communication session. Only one representative need respond to satisfy the request and allow the communication session to commence. If the request is accepted (517) by a merchant representative, the merchant is added to the communication session previously initiated (519). Otherwise, the session is ended where no one within the representative pool responds within a predetermined period of time (518).

Figure 5C:
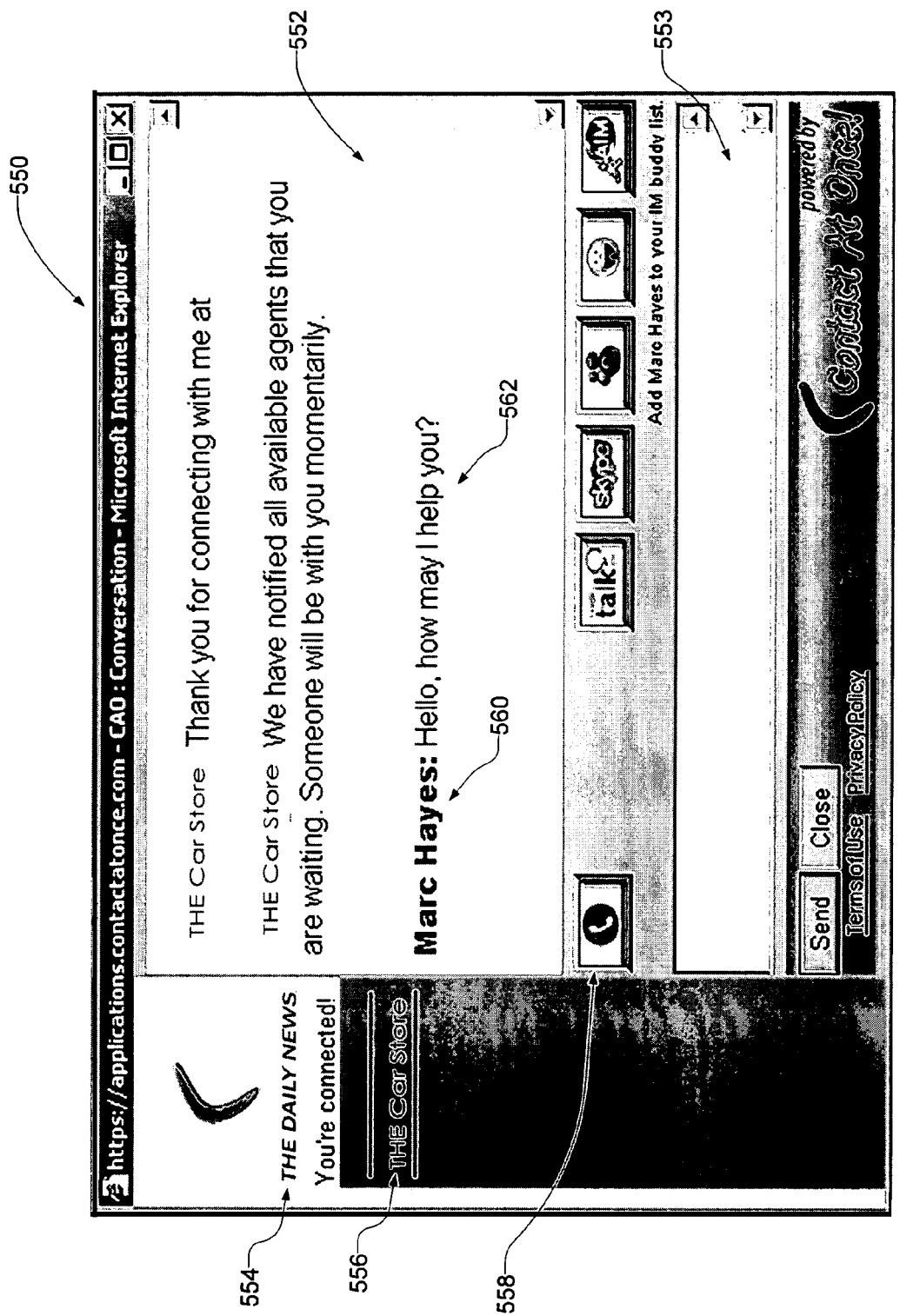

FIG. 5C is a diagram showing further details of the session window 550. In one implementation, the session window 550 includes a session transcript window 552 and a text entry box 553 to allow the consumer to enter text questions/comments to be forwarded to a merchant representative that has been added to the session. In this case, the transcript window 552 already includes text of a question 562 that has been received from an identified merchant representative 560. The session window 550 may also be configured to provide the consumer with additional information concerning the party/parties involved in the 2-way communication session. In this example, identification of an intermediary (publisher) 554 is provided, as well as identification of the merchant 556.

Intervention Window

Figure 5D:
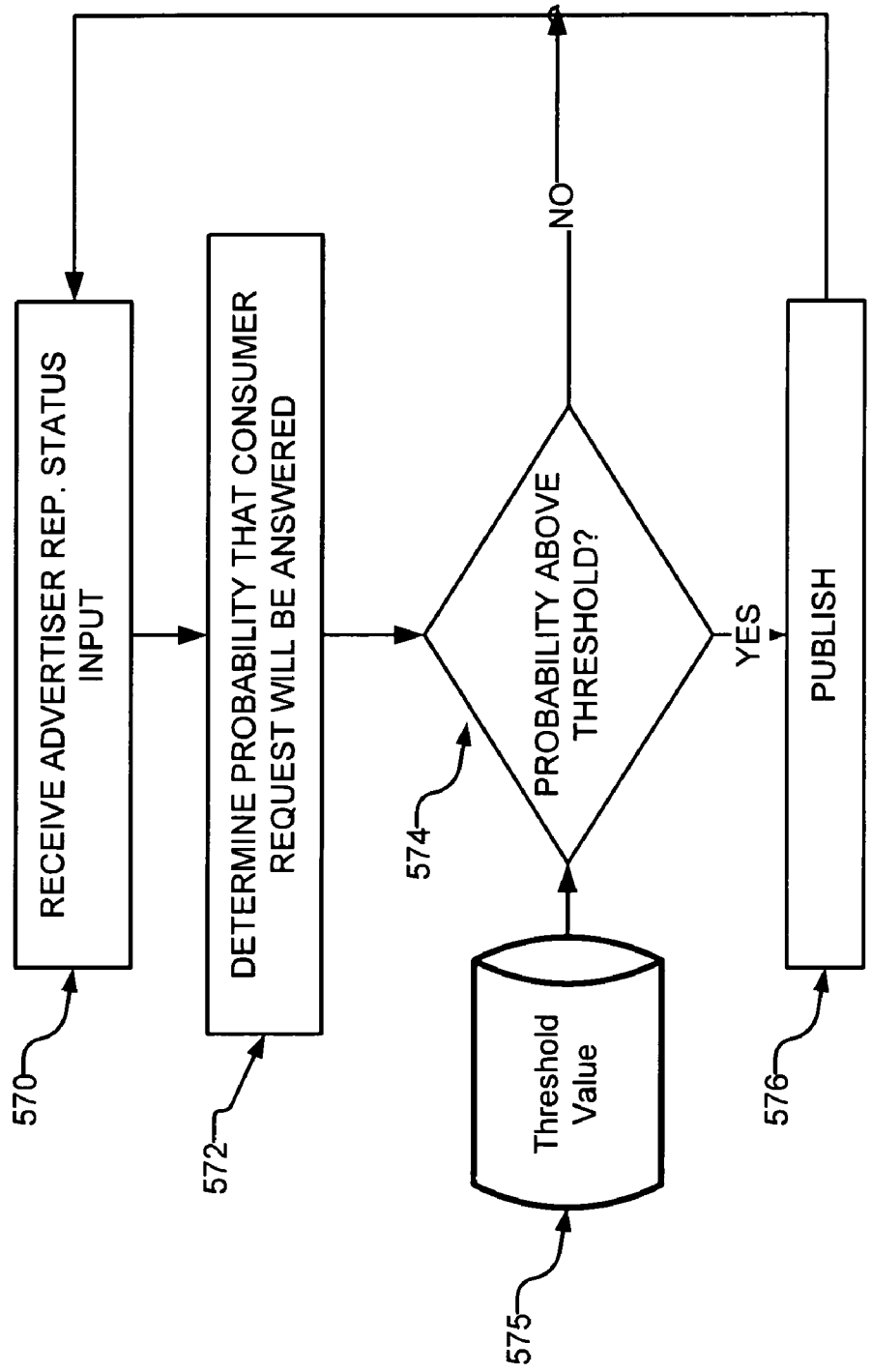
Figure 5E:
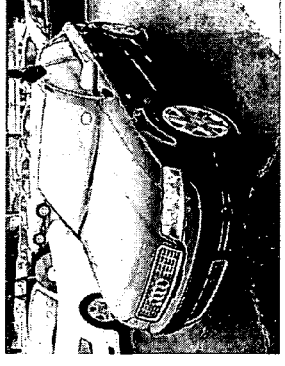
Figure 5F:
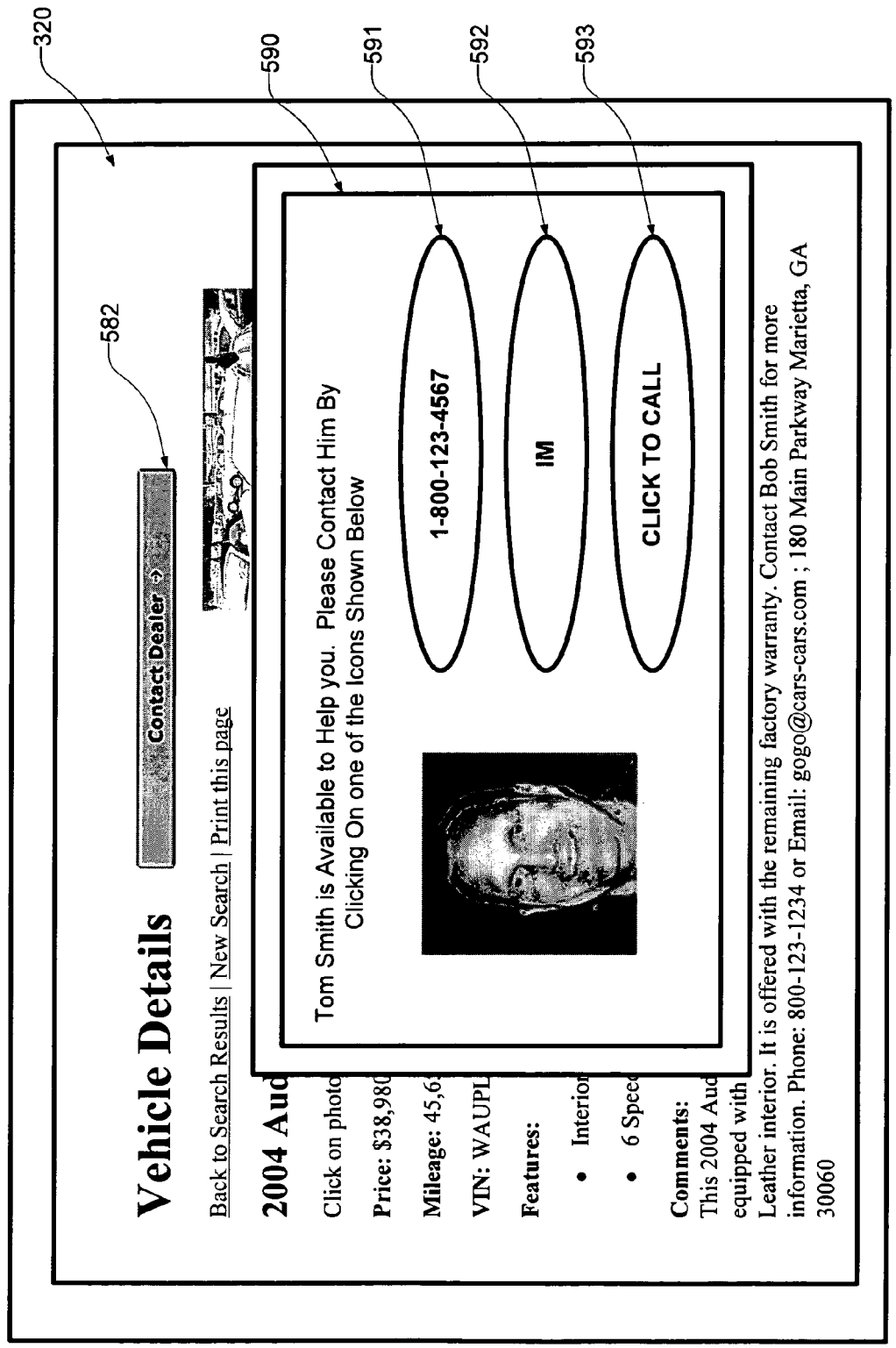

In a further embodiment of the invention, a contact link 582 is provided and published in conjunction with a given online advertisement 320 as shown in FIG. 5E. The contact link 582, when clicked (activated) by a consumer 230, causes an intervention window 590 to be displayed as shown in FIG. 5F when a merchant representative 220 is available to engage in a 2-way communication session with a consumer 230. The intervention window 590 may incorporate one or more links for initiating one or more various types of communication sessions with an available merchant representative 220. In the example depicted in FIG. 5F, the intervention window 590 includes links 591, 592 and 593. The link 591 may be configured to allow a consumer 230 to initiate, for example, a telephone call to the merchant representative 230. Link 592 may be configured to allow a consumer 230 to initiate, for example, a 2-way instant messaging (IM) session with the merchant representative 220. Similarly, link 593 may be configured to allow a consumer 230 to initiate, for example, a callback from the merchant representative 230. In a preferred embodiment, the intervention window only appears if a merchant representative is currently available to respond to a customer inquiry.

In one embodiment, only those links 591-593 corresponding to communications methods that are currently available to the merchant representative 220 at a given time are included (displayed) in the intervention window 590. For example, if the merchant representative is not able to receive telephone calls but only instant messaging messages, then only link 592, corresponding to instant messaging, would be included and displayed as a part of intervention window 590. In alternate embodiment, where the contact link 582 is clicked by a consumer 230 at a time when a merchant representative 220 is not available, the intervention window 590 may be configured to provide, for example, an e-mail form that will allow a consumer to send a message to the merchant for response at a time when the merchant is available.

Merchant Availability

Availability may be based on definite factors, such as the merchants' hours of operation or whether or not there are any merchant representatives in the representatives pool 350 (FIG. 3C) are logged into the DRCS 205. If, for example, the merchant is closed after 6:00 PM, the system may be configured to cause publishing the presence indicator with the advertisements of the merchant to be stopped. Alternatively, the system be configured to stop displaying the merchants advertisement in it's entirety at times outside of the merchants normal hours of operation.

Merchant availability may be based on one or more factors. In general, a merchant or merchant representative is available if they are able to engage in 2-way communications sessions initiated by consumers. Typically a merchant is represented by one or more persons. In the context of the present invention, a merchant representative pool 350 (FIG. 3C) is comprised of one or more persons associated with a merchant who are logged onto the DRCS 205 via, for example, a MCD.

Some real-time factors that DRCS 205 may monitor include, for example, the current time of day; whether or not a merchant representative is logged into the system; how many merchant representatives are logged into the system; how many logged-in merchant representatives are currently engaged in communication with a consumer; the specific type of Message Capable Device (MCD) that the representatives have logged into the DRCS 205 with.

Merely being logged into the system (or having a representative logged into the system) may satisfy the criteria for "availability". However, during any period of time, most merchants will be engaged with activities other than waiting for a consumer to request a 2-way communication session. Because of this it is possible that when a consumer does request a 2-way communication session, the logged-on merchant/representative will not actually be able to respond at the given time because they are tied up with other matters. In view of this, it is beneficial to obtain a more accurate assessment of whether or not a merchant/merchant representative will actually be able to respond to a request for a 2-way communication at a given time.

One way to more accurately assess the merchants' "availability" is by monitoring factors other than just whether or not the merchant is logged-in. For example, factors such as whether or not a merchant representative is, at the time, currently engaged in another 2-way communication session or not (and thus busy). Additional factors may also be considered, including, but not limited to whether or not the merchant is within close proximity of a MCD that is logged on to the system and capable of receiving requests for 2-way communication sessions. Proximity or motion sensors may be used to monitor the proximity near a given logged in MCD. The output of these proximity or motion sensors may provide another factor that can be taken into consideration in determining whether or not a representative is able to respond (or not) and thus, whether or not the merchant is "available".

Further factors that may be considered include, but are not limited to: the number of merchant representatives within the pool of merchant representatives (the more representatives there are, the more likely one will be available at any given time); the time of day (if it is after business hours, it is less likely that even an apparently logged-in representative will be available to respond, as well as the duration of time that has elapsed since the last interaction with a given MCD. It is also not uncommon for people to leave the proximity of a MCD without logging out of the system); the day of the week; the merchant hours of operation, etc.

TABLE 1 generally describes one method of determining the availability status of a merchant. In this table, two factors are used to determine the "availability" of a merchant: 1) whether or not merchant representatives are logged-in (on-line) and 2) whether or not the merchant representatives are busy with other matters, at a given time. Whether or not a representative is busy may be determined by monitoring any one or more of the factors discussed above,

TABLE 1

Determination of Availability

Merchant Representative Pool

| | REP 1 | | REP2 | | REP 3 | | |
|---|---|---|---|---|---|---|---|
| TIME | Online? | Not Busy? | Online? | Not Busy? | Online? | Not Busy? | AVAILABILITY STATUS |
| 0 | NO | — | NO | — | NO | — | Unavailable |
| 1 | YES | YES | NO | — | NO | — | Available |
| 2 | YES | NO | NO | — | NO | — | Unavailable |
| 3 | YES | YES | YES | YES | NO | — | Available |
| 4 | NO | — | NO | — | YES | YES | Available |
| 5 | NO | — | NO | — | NO | — | Unavailable |

It can be seen that any time at which one or more merchant representatives are determined to be logged-in and not busy, the merchant is deemed to be available. For greater assurances that a representative will actually be able to respond promptly, other criteria may also be adopted. For example, in order to be deemed available, it may be necessary for there to be predetermined minimum number of representatives within the pool who are both logged in and not busy. Alternatively, a predetermined minimum percentage of the merchant representative pool may be required in order for the merchant to be deemed available.

In one implementation of the invention, the history of each merchant representative in receiving and responding to requests for 2-way communications may be taken into account as a factor for purposes of determining availability. Where a representative has a history of successfully accepting requests for 2-way communications, it may be assumed that when that representative is logged in they will likely be able to respond, thus making the merchant more likely to be "available". Conversely, where the history of merchant representatives does not show a pattern of success in accepting requests for 2-way communications, it is perhaps more likely that the merchant should be deemed "unavailable" when one or more of those representatives are a part of the merchant representative pool.

In a further embodiment of the invention, availability is established based upon whether or not the probability of merchant being successful in accepting and engaging in a real-time 2-way communications session is above or below some predetermined threshold. The system and method determines availability by establishing the likelihood that a representative of an advertiser would actually be able to receive and engage in a 2-way communication session, such as a text message exchange, with a consumer. This may be determined based on various factors, including, but not limited to, for example, the number of advertiser representatives within a pool of advertiser representatives, the number of representatives actually logged-in at a given time, the number of logged-in advertiser representatives who are currently on the telephone; the number of other simultaneous inquiries that representatives within the pool are engaged in at the time, etc. If the likelihood that a representative from the pool would be able to respond is above a predetermined availability threshold, the system will cause, for example, the "presence indicator" to be published in the advertisement or allow the advertisement to be published or included in search results at a given time. The threshold value may be varied based upon advertiser or publisher preferences. Advertising fees may be raised or lowered based upon the established availability threshold. In this way, the chances the merchant will be able to respond to a consumer are greatly increased. Where the advertiser desires greater certainty with respect to their ability to respond to consumer inquires, the publisher may generate greater advertisement revenues by charging higher fees for advertisement. The flowchart of FIG. 5D generally describes this embodiment of the invention.

With reference to FIG. 5D the status of monitored factors pertaining to a merchant/merchant representative is received (570). Based upon the received information, the probability that the advertiser could actually respond to a consumer inquiry at the given time is determined (572). The probability is compared with a predetermined threshold value 575 (574). If the probability meets or exceeds the threshold value, then publication of the merchant's advertisements may be carried out at the time or included as a part of search results for specific consumer search queries (576).

Presence Optimized Publishing

A further aspect of the invention takes into account the availability of a merchant to actually receive and respond to consumer inquiries when generating and providing search results relevant to a consumer search query at a given time. In short the presence/availability of a merchant can be used to optimize the timing and placement when publishing advertisement.

The system can accommodate either or both "pay-per-click" or "pay-per-lead" based advertising. In "pay-per-click" advertising, the system allows advertisements, to be served/published online based upon, for example, the bid price and/or click-thru-rate. For example, in this way the system allows for maximizing revenue for the intermediary/paid search provider/publisher.

In pay-per-lead advertising, an intermediary, such as a publisher, is paid by an advertiser for every sales lead that results from an advertisement that the merchant buys/places with the publisher. To qualify as a sales lead, at least the identity of a person or entity potentially interested in purchasing a product or service should typically be obtained by the advertiser as a result of the advertisement. Other information may also be required, such as mailing address, telephone number, etc.

In the context of pay-per-lead advertising, the present system allows for revenue optimization by factoring in the "availability" of a merchant/advertiser to actually answer or otherwise respond to an online inquiry from an online consumer, since an un-answered call from a consumer is generally not a sales lead that can be billed by the intermediary/publisher. In one embodiment, the system continuously monitors the status of certain real-time factors related to the merchant and publishes an indication of the merchant's "availability" (i.e. whether or not the merchant is actually available or otherwise likely to respond to an inquiry from a consumer). This has been previously discussed above with respect to Table 1.

The system and method allows for a presence optimized paid search (POPS) to be conducted online by a consumer in a manner that increases the chances that an advertiser can turn an inquiry from the consumer into a valid sales lead or actual sale of an advertised item. For example, where a merchant is available, advertisements for that merchant may be included in a list of search results and/or sorted toward the top of the list of the search results. Otherwise, where the merchant is not available, advertisements for that merchant may be left out of a list of search results, and/or sorted toward the top of the list of the search results since the merchant will not be able to respond to the consumer inquires at the time. This methodology is generally described by the flowchart of FIG. 6A.

With reference to FIG. 6A, a search query is received (610). Advertisements meeting a search query are identified (612). A determination of the availability of the merchants for each advertisement is made (614). Search results are then published based upon the availability of merchants (616). In one embodiment, those merchants who are not available will not have their advertisements listed in the published search results. In another embodiment, those merchants are available will have their advertisements presented higher in the search results than those merchants that are not available.

A further aspect of the invention takes into account the availability of a merchant to receive and respond to consumer inquiries in determining whether or not an advertisement will be served/published at a particular time. FIG. 6B is a flowchart depicting a further embodiment of the methodology of the present invention. Advertisements meeting a search query are identified (622). A determination of the availability of the merchant advertiser at a given time is made (624). The advertisement may then be published based upon the availability of merchants (616). In one embodiment, where the merchant is determined to not be available, their advertisements will not be published at that time.

POPS enables paid search providers to optimize advertisement serving (publication) and placement by taking the advertiser's "availability" to respond to an online inquiry into account in determining when and/or where to serve/publish an advertisement. In short, where it is not useful for an advertiser to have advertisements published when they (the merchant) are not available to respond in real time to inquires, it may be desirable not to have the merchant advertisements published. This avoids unnecessary advertisement fees for the merchant, and increases the value of the advertisement service.

Where an advertiser (or advertiser representative) is available to actually respond to an inquiry, the probability of the consumer receiving a prompt response is greatly increased. For the publisher, the inquiry initiated by the consumer, as well as the response from the advertiser to the consumer, are track-able and may be treated as billable events for purposes of determining advertising rates/fees. Further, each of these events may be recorded as documentation of the occurrence of the event.

In the case where the system determines that a merchant is "not available" to respond to a consumer, the system may cause a merchants advertisement to simply not be served/published on-line by the intermediary until it is determined that the merchant is available. Alternatively, where the system determines that the merchant is not available, the merchant advertisement may be served/published on line, however without any presence indicator being published in connection with the advertisement. In this way, consumers viewing the advertisement will not be encouraged to attempt to obtain additional information at times when the merchant can not respond or the likelihood of the merchant responding is low.

Figure 6C:
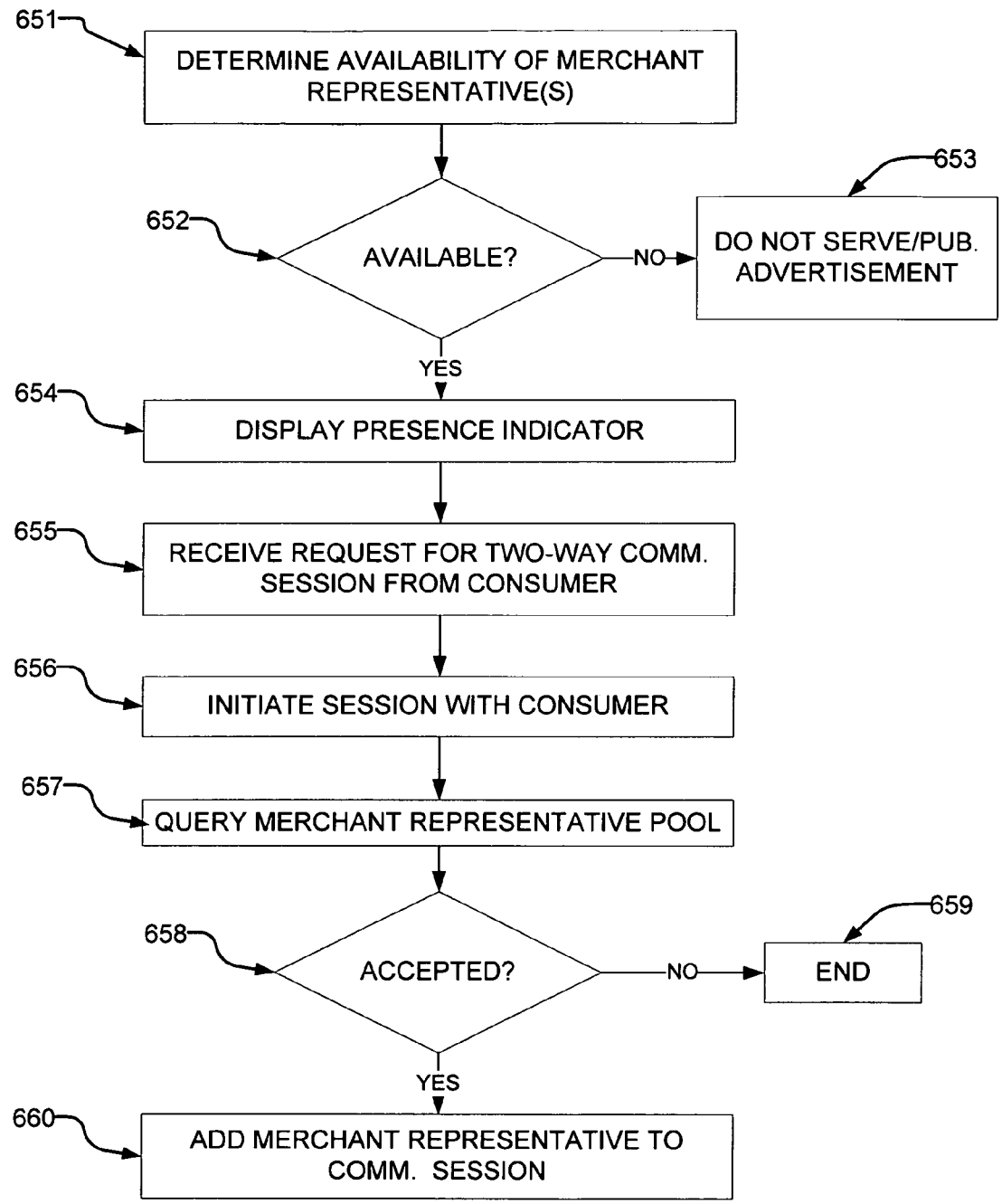

FIG. 6C is a diagram showing a flowchart that generally describes an embodiment of the present invention. In the embodiment, an advertisement and presence indicator is published/served at a given time only if it is determined that the merchant (as represented by available merchant representatives) is available to respond and engage in real time 2-way communications. In this embodiment, a determination is made as to the availability of merchant representatives (651). If the merchant is not available, advertisements associated with the merchant will not be published at a given time (653).

Alternatively, no presence indicator will be displayed in connection with a merchant advertisement or the advertisement will not be included in search results. Where the merchant is available, a presence indicator will be displayed in conjunction with a merchant advertisement (654). Where a request for a 2-way real-time communication session is requested (655) (as a result of the activation of a displayed presence indicator), a session will be initiated with the consumer (656). The merchant representative pool will be queried (657). When the query is accepted (658), the accepting merchant representative will be added, via an MCD associated with the representative, to the open session with the consumer. If the rep pool does not respond, the session with the consumer may be closed (659).

Developing/Substantiating Sales Leads

A sales lead is far more likely to result when a merchant actually responds to an inquiry from a consumer. Further, certain information must be obtained by the merchant in order to qualify a potential lead. In order to increase the chances that each consumer inquiry will yield an actual sales lead, the system may be configured to solicit certain information from the consumer. In one embodiment, the system and method may provide for collecting information from a consumer before alerting a merchant of a consumer inquiry stemming from a merchant advertisement. Information collected from the consumer may be recorded. In this way, it is possible to further distinguish actual sales leads from false or fraudulent clicks.

This information will also preferably be information necessary to qualify a consumer contact as a sales lead, such as, for example, a name and contact information. In order to establish sales leads, the invention attempts to collect information from a consumer who has requested a 2-way communication session.

Before bringing a merchant representative into the session, a pop-up window or fly-in is generated and displayed on, for example, a consumers MCD. This window preferably sets out a questionnaire like form with blanks for the consumer to fill in with particular requested information. This methodology is generally represented by the flowcharts of FIG. 7A-FIG. 7C.

Figure 7A:
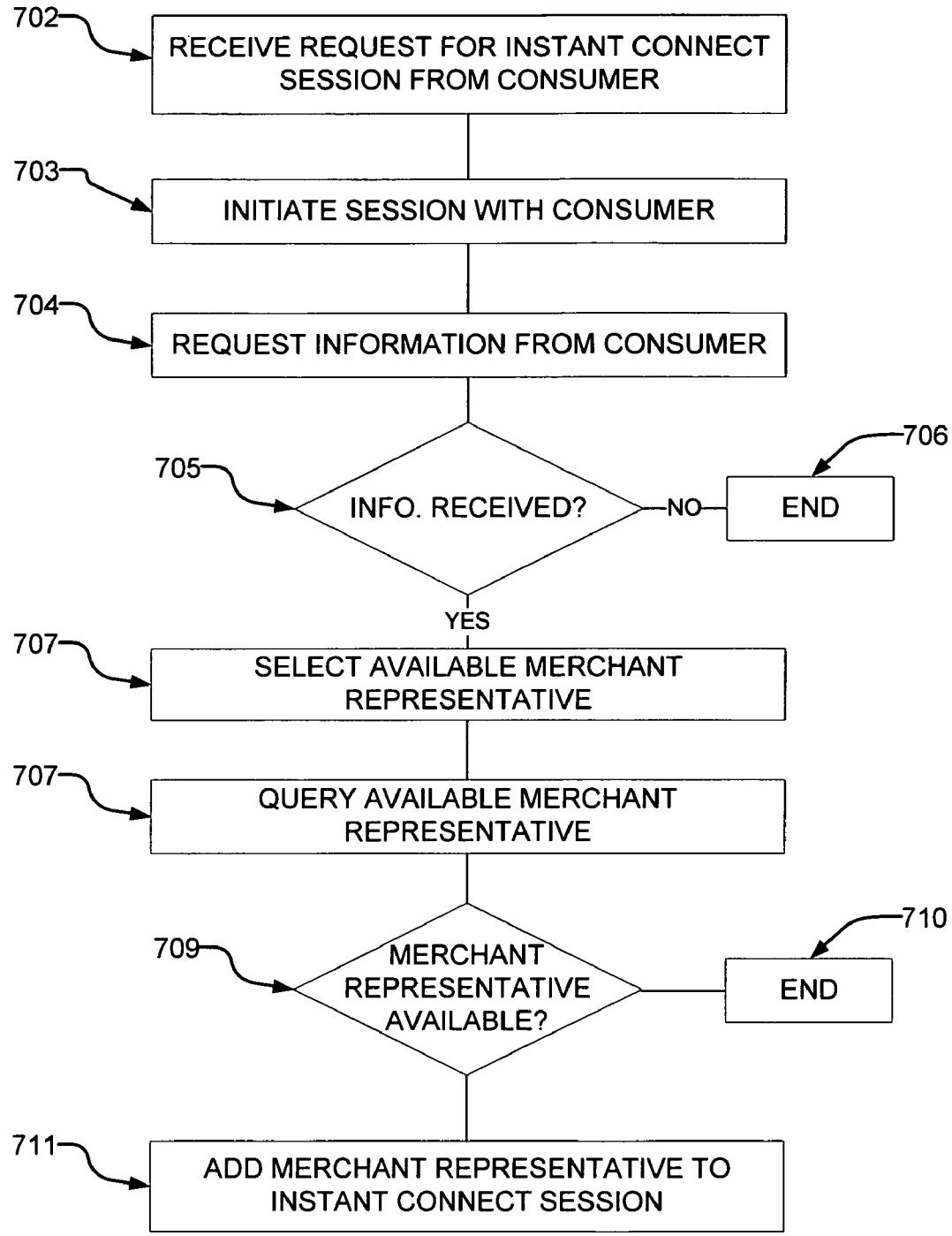
FIG. 7A-FIG. 7C are diagrams depicting a process for qualifying and substantiating sales leads.

With reference to FIG. 7A a request for a 2-way communication session is received (702). A communication session is initiated with the consumer (703), via opening a questionnaire window to solicit information from a consumer (704). When the information is received from the consumer, the system selects a merchant representative from a pool of merchant representatives (707) and query's the selected representative to join communications session (708). If the representative is available, the system adds the representative to the communication session (711). Otherwise the session may be terminated (710).

Figure 7B:
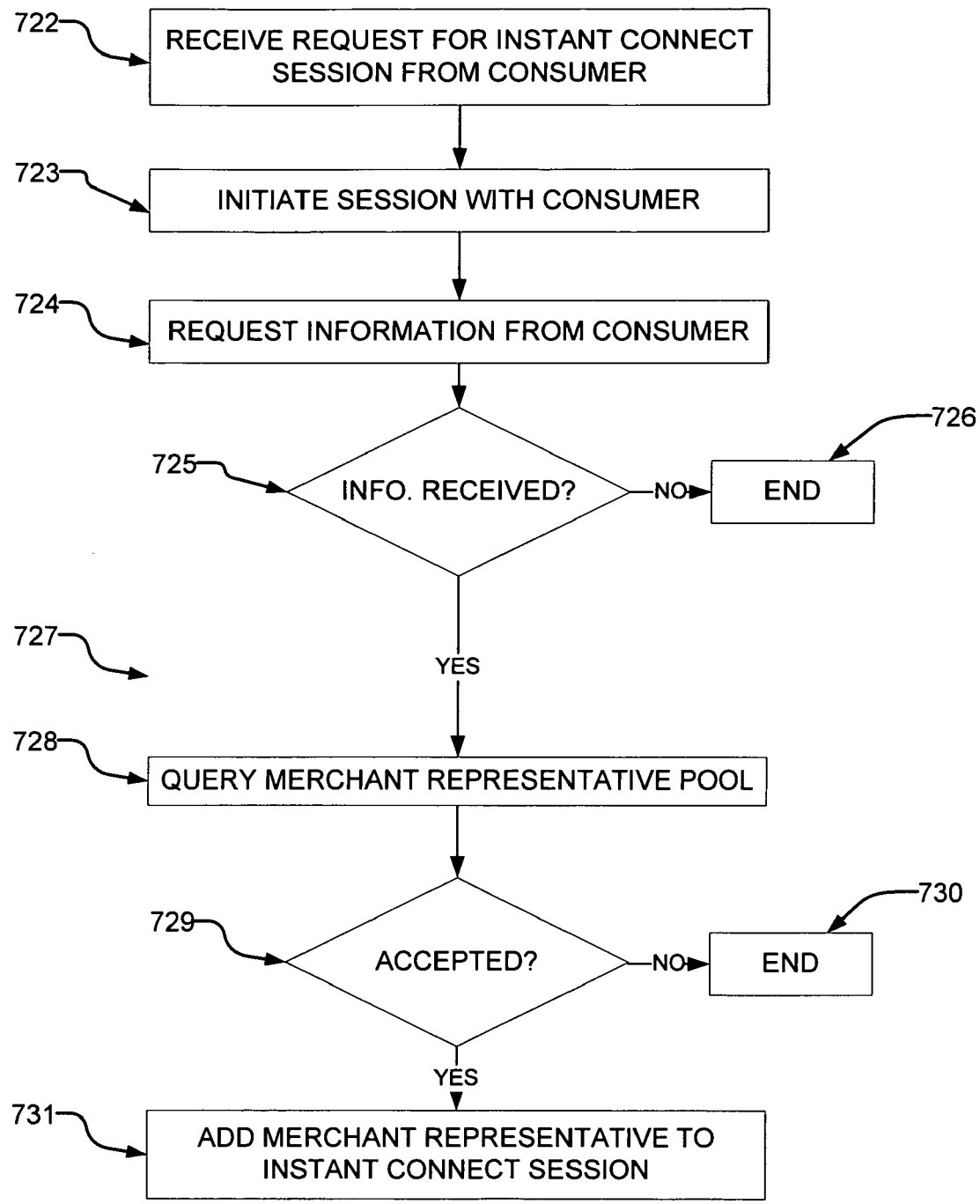

FIG. 7B shows a flowchart generally depicting an embodiment of the invention wherein the status of representatives within the merchant representative pool is monitored and when a consumer request is received, the alert is sent to a merchant representative who is determined to be available. A request from a consumer is received (722). A session is initiated with the consumer (723). Information is requested from the consumer, for example, name and contact information (724). A merchant representative determined to be available is selected (727) and a query is sent to the selected representative (728) via, an MCD associated with the selected representative. If the query/request is accepted by the selected representative (629), the selected merchant representative is added to the session with the consumer (731).

Figure 7C:
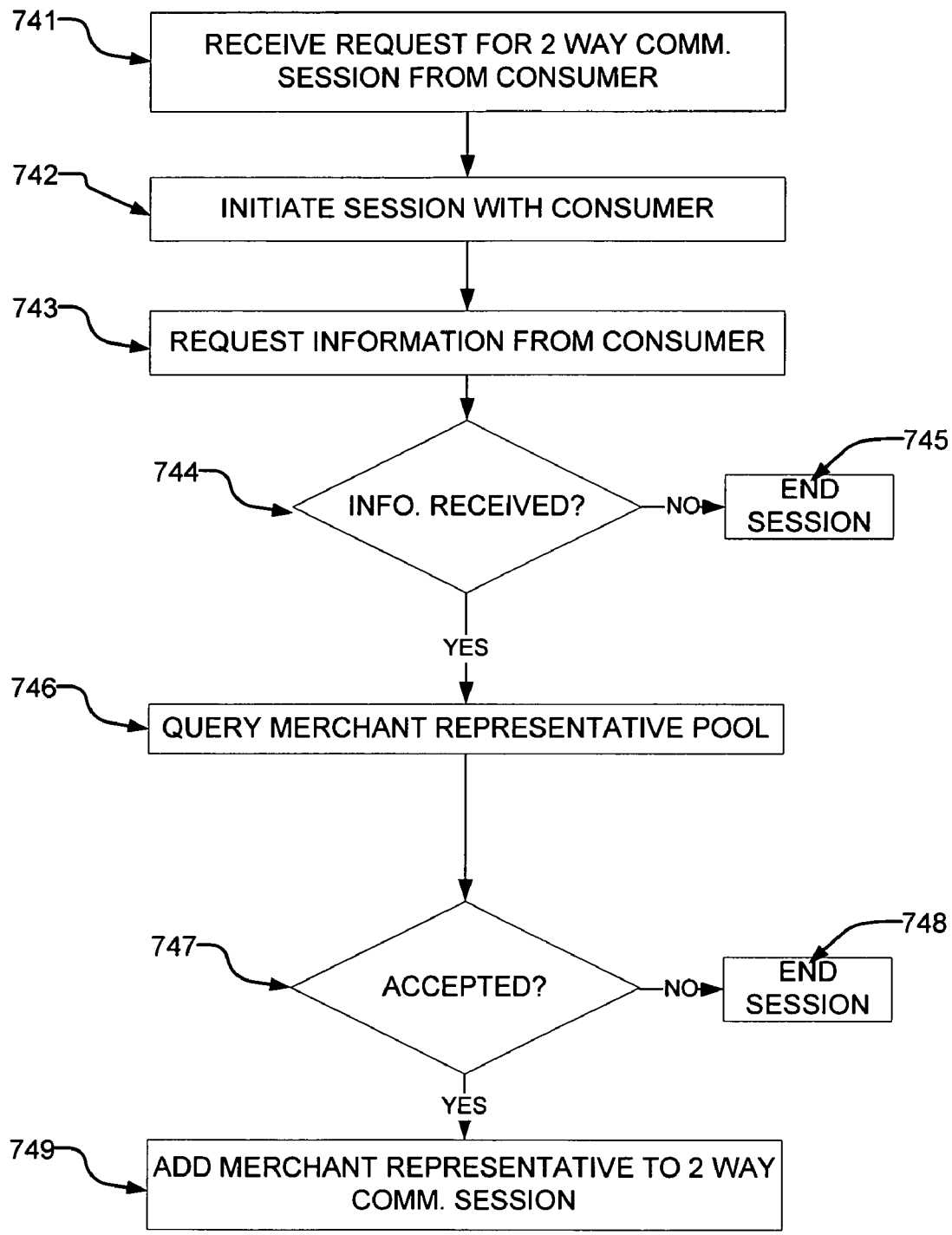

FIG. 7C shows a flowchart generally depicting an embodiment of the invention wherein the status of representatives within the merchant representative pool is monitored and when a consumer request is received, the pool is queried. The request is then handed to the merchant representative that is first to accept the query/request and the representative is added to a session with a requesting consumer. A request from a consumer is received (741). A session is initiated with the consumer (742). Information is requested from the consumer, for example, name and contact information (743). The representative pool is queried (746). Once the query/request is accepted by a representative (747), the merchant representative is added to the session with the consumer (749).

In another embodiment when a consumer request is received, an alert/request is then sent to each member of the merchant representative pool in sequential order until a merchant representative accepts the query/request. Once a merchant representative accepts the query/request they are added to a session with a requesting consumer.

Tracking and Reporting

In yet a further embodiment, a system and method is provided to track certain predetermined events relative to a click thru originating from a given advertisement, search listing or presence indicator. These tracked events may be used to provide an audit trail related to each advertisement and can be used to substantiate the authenticity of, for example, a particular "click-through". In a preferred embodiment, when a presence indicator is clicked the fact that it is activated is noted and recorded. Subsequently, if a 2-way communication with an advertiser representative is consummated, such event is also noted and recorded. Further, the content of any 2-way communication between the consumer and an advertiser representative may be recorded. By having these types of trackable events recorded, it is much easier to discern those "click thrus" that are genuine, or otherwise rise to the level of an actual "sales lead" from those that are fraudulent or otherwise bogus.

The system is further configured to generate and provide reports of all track-able information, as well as statistics and usage information based upon the track-able events and collected consumer information.

The processor 251 may be further configured to carry out any one or more of the functions carried out by the communication module 291, the availability module 282, the publishing module 283, the tracking module 284 and/or the reporting module 285 in accordance with, for example, software 258 stored in memory 256. The software 258 may include, for example, one or more applications, configured to carry out various processes or process steps according to the methodology depicted by the flowcharts of FIGS. 3B, 4, 5A, 5D, 6A, 5B, 6C, 7A, 7B and/or 7C.

In a preferred embodiment, the DRCS 205 is configured to receive status data concerning a pool of merchant representatives and to determine whether such status data indicates that it is likely that a merchant representative will be able to accept and engage in a 2-way real time communication with a consumer if they should initiate a request for a 2-way real time communication. In a further embodiment the DRCS 205 is configured to provide an indicator of a merchant/advertiser availability to a publisher of online advertisements and/or a online search provider. In another embodiment, the DRCS 205 is configured to receive a request for a 2-way communication session and to provide an alert/query to a merchant representative pool, if the alert/query is accepted by a representative within the pool the DRCS 205 is configured to add the merchant representative to a 2-way communication session.

The DRCS 205 may be configured to request data from, for example, a merchant 220, a consumer 230 and/or a intermediary 210. Similarly, the DRCS 205 may be configured to receive data and/or queries from, for example, a consumer 230. The DRCS 205 can be implemented in hardware, software, firmware, or a combination thereof. In a preferred embodiment(s), the DRCS 205 is implemented in software or firmware that is stored in a memory and that is executed by a suitable instruction execution system. If implemented in hardware, as in an alternative embodiment, the DRCS 205 can be implemented with any one or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow charts of FIGS. 3B, 4, 5A, 5D, 6A, 5B, 6C, 7A, 7B and/or 7C show the architecture, functionality, and operation of possible implementations of the software 258 (FIG. 2C). In this regard, each block represents a module, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in the reverse order, depending upon the functionality involved. The software program stored as software 305, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It will be recognized by those skilled in the art, that while certain aspects of the invention have been described in terms of hardware, it is possible and fully anticipated that such aspects can be implemented in software, and vice-a-versa. All such variations or implementations are fully contemplated by the present invention and are intended to full within the scope of the invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit, principles and scope of the invention. All such modifications and variations are fully intended to be included herein within the scope of the present invention and protected by the following claims.

What is claimed:

1. A system comprised of:
   a memory; and
   a processor, said processor configured to execute computer-executable code stored in the memory, said computer-executable code comprising:
   a communications module, wherein said communications module is configured to establish and control communication between a consumer device and a merchant representative device;
   an availability monitoring module, wherein said availability monitoring module is configured to:
   monitor availability status data relevant to a particular merchant, wherein the particular merchant comprises one or more merchant representatives, wherein the availability status data for each of the one or more merchant representatives comprises current log-in status and busy status, and wherein the current log-in status and the busy status are actively monitored in real-time;
   evaluate the availability status data to determine availability of the one or more merchant representatives to provide a real time two way communication session to a consumer, each merchant representative associated with a merchant device and each consumer associated with a consumer device;
   determine, that at least one of the one or more merchant representatives of the particular merchant is currently available for the real-time two way communication session based on the availability status data;
   a publication module, wherein prior to receiving a request for the real-time two way communication session from the consumer device, the publication module is configured to:
   issue a publication command based upon the availability of the one or more merchant representatives, wherein said publication command is based upon availability status data for the determined at least one merchant representative, said publication command providing instructions to publish an online presence indicator in conjunction with an advertisement relating to the particular merchant, wherein the online presence indicator is only published in conjunction with the advertisement when the determined at least one merchant representative is available;
   publish in response to the publication command issued prior to receiving the request for the real-time two way communication session from the consumer device, the advertisement and the online presence indicator to the consumer device.

2. The system of claim 1, wherein the availability monitoring module is further configured to determine the availability of a merchant to provide a real time response to the consumer, based upon said availability status data.

3. The system of claim 1, wherein the communications module is further configured to generate an alert for forwarding to respective merchant devices of the at least one or more merchant representatives upon receipt of the request from the consumer via the consumer's respective consumer device indicating the consumer desires to initiate communication with a merchant representative.

4. The system of claim 1, wherein the communications module is further configured to establish communication between the consumer device and the merchant representative device in real-time.

5. The system of claim 4, wherein communication between the consumer device and the merchant representative device comprises an instant messaging session.

6. The system of claim 4, wherein communication between the consumer device and the merchant representative device comprises a VoIP session.

7. The system of claim 4, wherein communication between the consumer device and the merchant representative device comprises a click-to-call session.

8. The system of claim 4, wherein communication between the consumer device and the merchant representative device comprises a video session.

9. The system of claim 1, wherein the availability monitoring module is further configured to evaluate said availability status data to determine the likelihood that a member of the one or more merchant representatives will be able to engage in the two-way real time communications session with the consumer at a given time via the member's respective merchant device and the consumer's respective consumer device.

10. The system of claim 1 further comprising an intermediary, said intermediary comprised of at least an intermediary processor and an intermediary memory, wherein said publication command is issued to the intermediary.

11. The system of claim 10, wherein the publication module is further configured to issue a publication signal to the intermediary to indicate whether the advertisement should be published in a sorted order in a list of search results at a given time.

12. The system of claim 10, wherein the publication module is further configured to issue a publication signal to the intermediary to indicate whether or not a given advertisement should be included in search results for a given consumer search query at a given time.

13. The system of claim 10, wherein the intermediary is configured to publish an item online based upon an electronic indication of availability of the one or more merchant representatives from the respective merchant device of the one or more merchant representatives.

14. The system of claim 10, wherein said intermediary is configured to determine the availability of the one or more merchant representatives based upon the availability status data for a given pool of merchant representatives.

15. The system of claim 10, wherein said intermediary is configured to receive an electronic indication of the one or more merchant representative's availability from the availability monitoring module.

16. The system of claim 14, wherein said intermediary is configured to publish the advertisement online at a given time, where it is determined that the one or more merchant representatives is available.

17. The system of claim 14, wherein said intermediary is configured to publish the electronic presence indicator at a given time, in connection with the advertisement, where it is determined that the one or more merchant representatives is available.

18. The system of claim 14, wherein said intermediary is configured to publish search results inclusive of the advertisement where it is determined that the one or more merchant representative is available.

19. The system of claim 15, wherein said intermediary is configured to publish the advertisement online at a given time based upon the electronic indication of the one or more merchant representative's availability.

20. The system of claim 15, wherein said intermediary is configured to publish the presence indicator at a given time, in connection with the advertisement based upon the electronic indication of the one or more merchant representative's availability.

21. The system of claim 15, wherein said intermediary is configured to publish search results inclusive of the advertisement online based upon the electronic indication of the one or more merchant representative's availability.

22. The system of claim 11, wherein the availability monitoring module dynamically presents merchant representative information within the advertisement.

23. The system of claim 1, wherein the availability monitoring device includes a motion sensor to determine a physical presence of at least one of the merchant representatives.

24. A computer-implemented method of publishing an item online comprising the steps of:
   a. receiving, by a computer, availability status data pertaining to a particular merchant, wherein the particular merchant comprises one or more merchant representatives;
      wherein the availability status data for each of the one or more merchant representatives comprises current log-in status and busy status, and
      wherein the current log-in status and the busy status are actively monitored in real-time;
   b. evaluating, by the computer, said availability status data to determine the availability of the one or more merchant representatives to engage in a real time two-way communications session with a consumer using a merchant device and a consumer device, respectively;
   c. determining, by the computer, that at least one of the one or more merchant representatives of the particular merchant is currently available for the real-time two-way communication session based on the availability status data;
   d. issuing, by the computer, a publication command prior to receiving a request for the real-time two way communication session from the consumer device,
      wherein the publication command is based upon the availability status data for the determined at least one merchant representative that is currently available, said publication command providing instructions to publish an online presence indicator in conjunction with the advertisement relating to the particular merchant;
      wherein the online presence indicator is only published in conjunction with the advertisement when the determined at least one merchant representative is available; and
   e. publishing, by the computer, in response to the publication command issued prior to receiving the request for the real-time two way communication session from the consumer device, the advertisement and the online presence indicator, to the consumer device.

25. The method of claim 24 further comprising the step of publishing a search request inclusive of a given advertisement, based upon the availability of the merchant at a given time.

26. The method of claim 24, further comprising:
receiving the request for the real-time two way communication session from the consumer device and substantially simultaneously alerting each currently available merchant representative of the request for the real-time two way communication session; and
responding to the request for the real-time two way communication session by establishing a real time two-way communications session with the consumer and a first one of the currently available merchant representatives to respond the request for the real-time two way communication session.

27. A computer-implemented method of publishing an item online comprising:
a. receiving, by a computer, availability status data pertaining to a particular merchant, wherein the particular merchant comprises one or more merchant representatives; wherein the availability status data for each of the one or more merchant representatives comprises current log-in status and busy status, and
wherein the current log-in status and the busy status are actively monitored in real-time;
b. evaluating, the computer, said availability status data to determine the availability of the one or more merchant representatives to engage in a real time two-way communications session with a consumer using a merchant device and a consumer device, respectively;
c. determining, by the computer, that at least one of the one or more merchant representatives of the particular merchant is currently available for the real-time two-way communication session based on the availability status data;
d. issuing, by the computer, a publication command prior to receiving a request for the real-time two way communication session from the consumer device,
wherein the publication command is based upon the availability status data for the determined at least one merchant representative that is currently available, said publication command providing instructions to publish an online presence indicator in conjunction with an advertisement associated with the particular merchant,
wherein the online presence indicator is only published in conjunction with the advertisement when the determined at least one merchant representative is available; and
d. publishing, by the computer, in response to the publication command issued prior to receiving the request for the real-time two way communication session from the consumer device, the advertisement and the online presence indicator, to the consumer device,
wherein the online presence indicator is engagable to initiate a communication window, the communication window facilitating the real-time two-way communication session.

28. The method of claim 27, wherein the communication window comprises a contact link associated with the at least one currently available merchant representative, wherein the contact link is engageable to initiate the real-time two-way communication session with the consumer and the at least one currently available merchant representative.

29. The method of claim 27, wherein the availability status data represents whether at least one of the one or more merchant representatives is engaged in a two-way communication session.

30. The method of claim 27, wherein the availability status data represents whether at least one of the one or more merchant representatives is within close proximity of an associated message capable device.

31. The method of claim 27, wherein the availability status data represents availability factors for each of the one or more merchant representatives, the availability factors comprising at least one of, a time of day, a duration of time that has elapsed since the last interaction with a message capable device, a day of the week, and merchant hours of operation.

32. The method of claim 27, further comprising receiving the request for a communication session from the consumer device and alerting each currently available merchant representative of the one or more merchant representatives of the request for the real-time two way communication session.

33. The method of claim 32, further comprising responding to the request for the real-time two way communication session by establishing a real time two-way communication session with the consumer and a first one of the currently available merchant representatives to respond the request for the real-time two way communication session.

34. The method of claim 32, wherein each of the currently available merchant representatives is simultaneously alerted of the request for the real-time two way communication session.

35. The method of claim 32, wherein each of the currently available merchant representatives is sequentially alerted of the request for the real-time two way communication session.

36. The method of claim 27, further comprising publishing information relating to one or more of products and services provided by the merchant, wherein the communication window is at least partially overlaying the published information.

* * * * *